(12) United States Patent
Hara et al.

(10) Patent No.: US 8,251,375 B2
(45) Date of Patent: *Aug. 28, 2012

(54) BODY LEANING CONTROL SYSTEM, AND A SADDLE RIDING TYPE VEHICLE HAVING THE SAME

(75) Inventors: Nobuo Hara, Shizuoka (JP); Yasuhiro Oomura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 454 days.

This patent is subject to a terminal disclaimer.

(21) Appl. No.: 12/511,088

(22) Filed: Jul. 29, 2009

(65) Prior Publication Data
US 2010/0025944 A1 Feb. 4, 2010

(30) Foreign Application Priority Data

Jul. 31, 2008 (JP) ................................. 2008-197776

(51) Int. Cl.
*B60G 21/00* (2006.01)
(52) U.S. Cl. ............ 280/5.509; 280/5.506; 701/38
(58) Field of Classification Search ............ 280/5.5, 280/5.506, 5.507, 5.509, 124.103; 701/37, 701/38
See application file for complete search history.

(56) References Cited

U.S. PATENT DOCUMENTS

| | | | | |
|---|---|---|---|---|
| 4,351,410 A * | 9/1982 | Townsend | | 180/210 |
| 5,116,069 A * | 5/1992 | Miller | | 280/5.509 |
| 6,435,522 B1 * | 8/2002 | Van Den Brink et al. | | 280/5.509 |
| 7,131,650 B2 * | 11/2006 | Melcher | | 280/5.52 |
| 7,600,596 B2 * | 10/2009 | Van Den Brink et al. | | 180/210 |
| 7,802,800 B2 * | 9/2010 | Melcher | | 280/5.509 |
| 7,931,286 B2 * | 4/2011 | Melcher | | 280/124.103 |
| 8,020,878 B2 * | 9/2011 | Hara et al. | | 280/5.509 |
| 8,070,172 B1 * | 12/2011 | Smith et al. | | 280/124.103 |
| 2005/0012291 A1 | 1/2005 | Bagnoli | | |

(Continued)

FOREIGN PATENT DOCUMENTS

EP 1 248 013 A2 10/2002

(Continued)

OTHER PUBLICATIONS

Official Communication issued in corresponding European Patent Application No. 09009884.9, mailed on Nov. 19, 2009.

(Continued)

*Primary Examiner* — Paul N Dickson
*Assistant Examiner* — Timothy Wilhelm
(74) *Attorney, Agent, or Firm* — Keating & Bennett, LLP

(57) ABSTRACT

A body leaning control system includes a support mechanism arranged to support a pair of wheels to be movable up and down relative to a vehicle body, a resistance applying mechanism arranged to apply to the support mechanism a resistance to up-and-down motions of the pair of wheels, a lean amount acquiring device arranged to detect a lean amount of the vehicle body, and a controller arranged, based on detection results received from the lean amount acquiring device, to set the resistance of the resistance applying mechanism to a first resistance when the lean amount of the vehicle body exceeds a first angle, and to set the resistance of the resistance applying mechanism to a second resistance smaller than the first resistance when the lean amount of the vehicle body is at the first angle or less. This system can conveniently inhibit the vehicle body from leaning in excess of the first angle.

10 Claims, 17 Drawing Sheets

U.S. PATENT DOCUMENTS

2009/0312908 A1 * 12/2009 Van Den Brink ............... 701/38
2010/0032914 A1 * 2/2010 Hara et al. ................. 280/5.509

FOREIGN PATENT DOCUMENTS

| EP | 1 318 069 A2 | 6/2003 |
|---|---|---|
| EP | 1 870 269 A1 | 12/2007 |
| JP | 58-188771 A | 11/1983 |
| JP | 59-179467 A | 10/1984 |
| JP | 2004-359232 A | 12/2004 |
| WO | 2004/011324 A1 | 2/2004 |

OTHER PUBLICATIONS

Hara et al.; "Body Leaning Control System, and a Saddle Riding Type Vehicle Having the Same"; U.S. Appl. No. 12/511,089, filed Jul. 29, 2009.

* cited by examiner

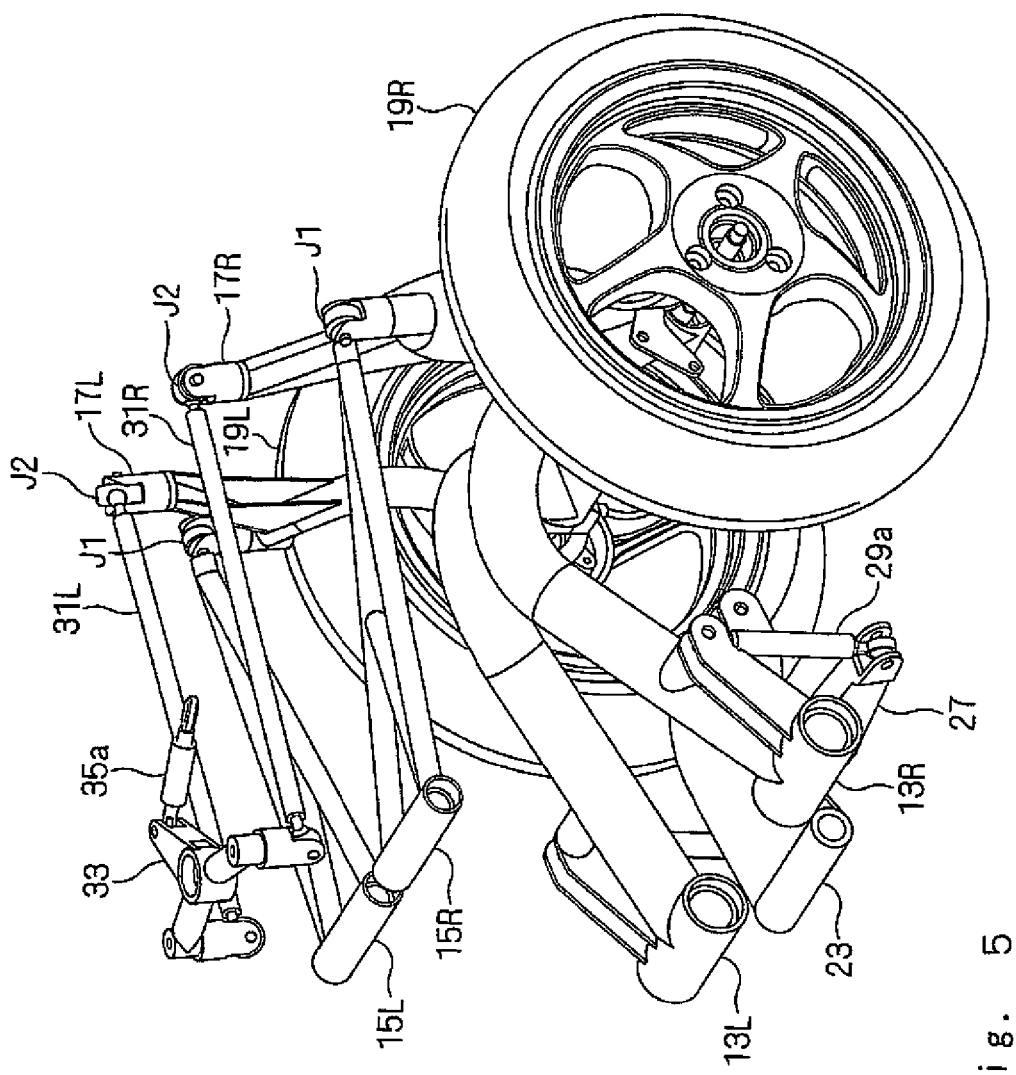
Fig. 5
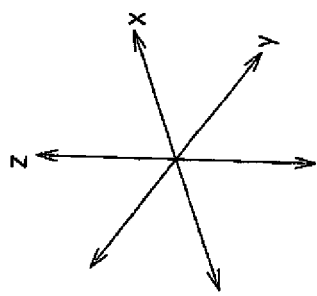

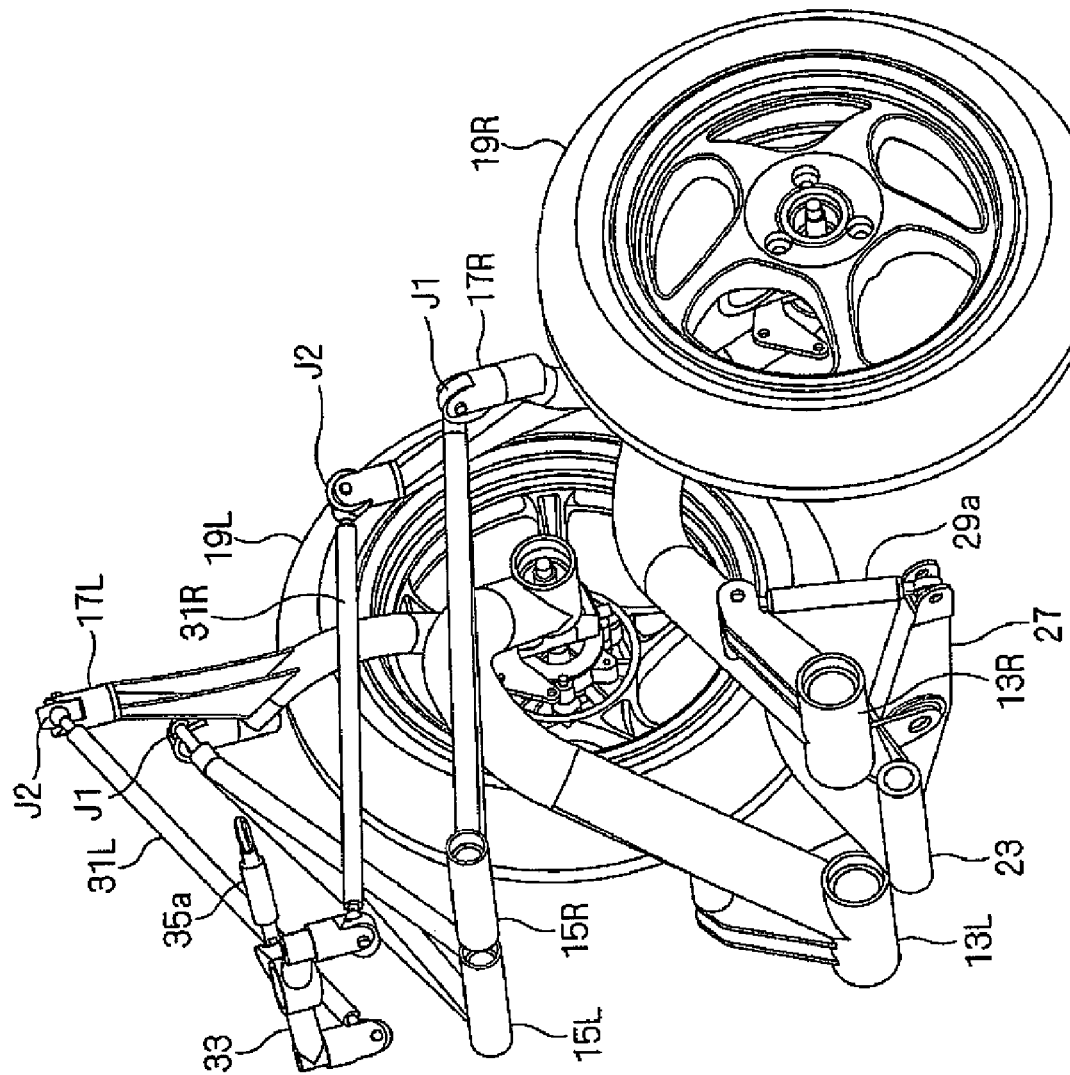
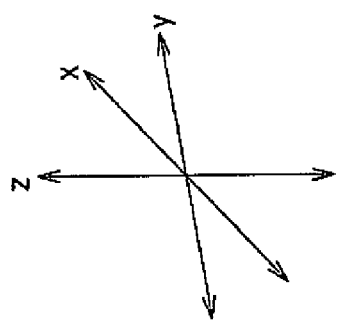
Fig. 7

BODY LEANING CONTROL SYSTEM, AND A SADDLE RIDING TYPE VEHICLE HAVING THE SAME

BACKGROUND OF THE INVENTION

1. Field of the Invention

The present invention relates to a body leaning control system for use on a saddle riding type vehicle having a pair of traveling members at least at the front or rear portion of a vehicle body, which can make turns by leaning the vehicle body, and also relates to a saddle riding type vehicle including such the body leaning control system.

2. Description of the Related Art

A saddle riding type vehicle has heretofore been proposed that has a pair of wheels (traveling members) arranged at both the front portion and/or rear portion of the vehicle body, and a support mechanism for supporting at least one pair of wheels to be movable up and down relative to the vehicle body. The saddle riding type vehicle constructed in this way can make turns by leaning the vehicle body as does a motorcycle (as disclosed in Japanese Unexamined Patent Publication No. 2004-359232, Japanese Unexamined Patent Publication No. S59-179467 and Japanese Unexamined Patent Publication S58-188771, for example).

Japanese Unexamined Patent Publication No. 2004-359232 discloses a three-wheeled automotive vehicle having a pair of wheels provided at the front of a vehicle body. A support mechanism supporting the pair of wheels includes a group of rolls held to form a shape of an articulated square by two crossbars arranged vertically and rotatably supported at the forward end of a main frame, a right side tube connected to right ends of both crossbars, and a left side tube connected to left ends of both crossbars. The pair of right and left tubes rotatably support the pair of wheels. The support mechanism constructed in this way supports the pair of wheels to be movable up and down relative to the vehicle body. Thus, the vehicle disclosed in Japanese Unexamined Patent Publication No. 2004-359232 can make turns while leaning the main frame with the pair of wheels contacting the traveling surface.

Japanese Unexamined Patent Publication S59-179467 and Japanese Unexamined Patent Publication S58-188771 each disclose a three-wheeled automotive vehicle having a pair of wheels at the rear of a vehicle body. The pair of wheels are rockably supported by a main frame. The vehicle further includes a device for limiting rocking of the pair of wheels, and a device for detecting vehicle speed, for limiting the rocking when the vehicle speed falls to a certain fixed speed. This stabilizes the position of the vehicle body when stopping, for example.

However, the conventional vehicles with such constructions have the following drawbacks and disadvantages.

With the conventional constructions, the rocking is limited when the vehicle speed falls to a fixed speed, and whether to carry out the rocking limitation is not related to lean angles of the vehicle body. Therefore, the rocking limitation may not take place even when the vehicle body leans to an excessive degree. In order to return the vehicle body to a neutral position when the vehicle body leans to an excessive degree, the rider carries out accelerator control and steering control, and/or changes his or her riding position to shift the center of gravity (hereinafter called "return control" as appropriate). However, such return control imposes a burden on the rider when the vehicle body leans to an excessive degree, which can cause an inconvenience of impairing a comfortable run.

SUMMARY OF THE INVENTION

In view of the above, preferred embodiments of the present invention provide a body leaning control system and a saddle riding type vehicle including such a body leaning control system, in which the vehicle has a pair of traveling members at least at the front or rear, and a vehicle body is prevented from leaning to an excessive degree while permitting leaning of the vehicle body.

According to a preferred embodiment of the present invention, a body leaning control system for a saddle riding type vehicle capable of making turns by leaning a vehicle body preferably includes a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean amount acquiring device arranged to detect information on a lean amount of the vehicle body; and a controller arranged to perform control, based on detection results received from the lean amount acquiring device, so as to set the resistance of the resistance applying mechanism to a first resistance when the lean amount of the vehicle body exceeds a first angle, and to set the resistance of the resistance applying mechanism to a second resistance smaller than the first resistance when the lean amount of the vehicle body is at the first angle or less.

The support mechanism preferably is arranged to support a pair of traveling members to be movable up and down relative to the vehicle body. Thus, the vehicle body can be leaned with the pair of traveling members contacting the load surface. The vehicle can therefore run by leaning the vehicle body at a time of making a turn, for example. The controller controls the resistance applying mechanism based on detection results received from the lean amount acquiring device which detects information on a lean amount of the vehicle body. Specifically, the controller controls the resistance applying mechanism to apply a first resistance to the support mechanism when the lean amount of the vehicle body exceeds a first angle. When the lean amount of the vehicle body is at the first angle or less, the controller controls the resistance applying mechanism to apply a second resistance smaller than the first resistance to the support mechanism.

Thus, when the lean amount of the vehicle body exceeds the first angle, the controller sets the first resistance which is stronger than the second resistance (set when the lean amount of the vehicle body is at the first angle or less), which causes the pair of traveling members to become not easily movable up and down. This inhibits further variations in the lean amount of the vehicle body, which conveniently inhibits the vehicle body from leaning in excess of the first angle. That is, the vehicle body is inhibited from leaning to excess, thereby reducing a troublesome operating load on the rider, and allowing the rider to travel comfortably.

Here, the "saddle riding type vehicle" may preferably include, besides a vehicle driven by the rider straddling the saddle, a scooter type vehicle driven by the rider seated with his or her legs close together. The "saddle riding type vehicle" may preferably include a three-wheeled automotive vehicle and a four-wheeled automotive vehicle whose traveling members are wheels, and a snowmobile whose traveling members are skis. The "vehicle body" refers to a main frame and components fixed to be integral therewith. The "lean amount of the vehicle body" is a degree of a lean angle of the vehicle body, which always has a positive value.

It is preferred that the system further includes a vehicle speed detecting device arranged to detect a vehicle speed, wherein the controller is arranged to set the first angle based on a detection result received from the vehicle speed detecting device. The controller sets the first angle in response to the vehicle speed, thereby inhibiting an excessive leaning of the vehicle body with an appropriate timing according to the vehicle speed.

It is preferred that the controller is arranged to set the first angle to include a region where the first angle increases with the vehicle speed. In an actual running situation, a range of the lean amount of the vehicle body enabling a comfortable run is considered to increase with the vehicle speed. Thus, according to a preferred embodiment of the present invention, leaning of the vehicle body can be inhibited with appropriate timing in an actual running situation.

It is preferred that the system further includes a vehicle speed detecting device arranged to detect a vehicle speed, wherein the controller is arranged, based on detection results received from the vehicle speed detecting device, to set the first resistance to include a region where the first resistance decreases with an increase in the vehicle speed. When vehicle speed is relatively fast, centrifugal force is strong, and therefore an excessive leaning of the vehicle body can be inhibited appropriately even if the first resistance is relatively weak. When vehicle speed is relatively slow, centrifugal force is weak but the first resistance is relatively strong, and therefor an excessive leaning of the vehicle body can be inhibited appropriately.

Generally, the rider must make a greater effort to return the vehicle body to the neutral position when vehicle speed is slow than when vehicle speed is fast. However, since the first resistance is set to be relatively strong for a slow vehicle speed, the rider's effort can be reduced effectively. By lightening the rider's load in this way, the rider can travel comfortably.

It is preferred that the lean amount of the vehicle body is a degree of an angle at which the vehicle body leans sideways relative to a substantially vertical direction. Then, the lean amount of the vehicle body can be determined accurately regardless of traveling surface conditions, for example.

It is preferred that the system further includes an angular speed acquiring device arranged to detect information on an angular speed of the lean amount of the vehicle body, wherein the controller is arranged, based on detection results received from the angular speed acquiring device, to set the first angle to include a region where the first angle increases with the angular speed of the lean amount. This construction can effectively inhibit the vehicle body from leaning to excess.

It is preferred that the system further includes an angular speed acquiring device arranged to detect information on an angular speed of the lean amount of the vehicle body, wherein the controller is arranged to determine whether the lean amount of the vehicle body is decreasing, based on detection results received from the lean amount acquiring device and the angular speed acquiring device, and to set the resistance of the resistance applying mechanism to a third resistance smaller than the first resistance when the lean amount of the vehicle body exceeds the first angle and is decreasing. The lean amount of the vehicle body is variable in two ways; the lean amount either increases or decreases. When the vehicle body returns to the neutral position, the lean amount of the vehicle body decreases. When the vehicle body leans away from the neutral position, the lean amount of the vehicle body increases. According to a preferred embodiment of the present invention, when the lean amount of the vehicle body exceeds the first angle but is decreasing, the third resistance weaker than the first resistance is applied to the support mechanism, thereby permitting the vehicle body to return to the neutral position relatively easily.

It is preferred that the third resistance has a substantially minimum value of the resistance of the resistance applying mechanism. This permits the vehicle body to return to the neutral position very easily.

It is preferred that the second resistance has a substantially minimum value of the resistance of the resistance applying mechanism. This permits the rider to lean the vehicle body freely at will when the lean amount of the vehicle body is in a range of the first angle and less.

It is preferred that the support mechanism includes a right side support mechanism arranged to vertically movably support a right traveling member in the pair of traveling members; a left side support mechanism arranged to vertically movably support a left traveling member in the pair of traveling members; and a balancer mechanism rotatably supported by the vehicle body and interlocked to the right side support mechanism and the left side support mechanism to allow the right traveling member and the left traveling member to move up and down in corresponding amounts in opposite directions; and the resistance applying mechanism includes a damper body arranged to damp rotation of the balancer mechanism relative to the vehicle body; and an adjusting element arranged to vary a damping force of the damper body; and the controller is arranged to control resistance to the rotation of the balancer mechanism by driving the adjusting element. Then, the resistance applying mechanism can be constructed conveniently.

It is preferred that the traveling members are wheels or skis, for example. Thus, the body leaning control system can be applied easily and conveniently to a saddle riding type vehicle having wheels or skis.

According to another preferred embodiment of the present invention, a saddle riding type vehicle includes a body leaning control system and is capable of making turns by leaning a vehicle body, the body leaning control system including a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean amount acquiring device arranged to detect information on a lean amount of the vehicle body; and a controller arranged to perform control, based on detection results received from the lean amount acquiring device, to set the resistance of the resistance applying mechanism to a first resistance when the lean amount of the vehicle body exceeds a first angle, and to set the resistance of the resistance applying mechanism to a second resistance smaller than the first resistance when the lean amount of the vehicle body is at the first angle or less.

According to various preferred embodiments of the present invention, the rider can ride and run comfortably on the saddle riding type vehicle.

The support mechanism preferably supports a pair of traveling members arranged at a front portion of the vehicle body, and a pair of traveling members arranged at a rear portion of the vehicle body, to be movable up and down relative to the vehicle body, respectively, and the resistance applying mechanism is arranged to apply a resistance to the support mechanism connected to one of the pairs of traveling members at the front portion and the rear portion.

Even where the support mechanism supports two pairs of traveling members provided at the front and rear of the vehicle body, respectively, the construction can be simplified since the resistance applying mechanism is constructed to apply resistance to the up-and-down motions of one pair of traveling members at the front or rear portion.

The first angle preferably has a substantially upper limit value of the lean amount of the vehicle body for permitting the rider to decrease the lean amount of the vehicle body easily thus making it is possible to inhibit the vehicle body from leaning to such an excessive degree as to impair a comfortable run.

The first angle preferably has a fixed value so that the processing by the controller can be simplified.

The controller is preferably arranged to set the first angle to increase with the vehicle speed over an entire range of vehicle speeds.

The controller is also preferably arranged to set the first angle to include a region where the first angle increases with the vehicle speed, and such that the first angle is fixed despite an increase in the vehicle speed except in the region where the first angle increases with the vehicle speed.

Thus, the controller can set the first angle appropriately adapted to an actual traveling situation.

The controller is preferably arranged to set the first resistance to decrease with an increase in the vehicle speed over an entire range of vehicle speeds.

The controller is also preferably arranged to set the first resistance to include a region where the first resistance decreases with an increase in the vehicle speed, and such that the first resistance is fixed despite an increase in the vehicle speed except in the region where the first resistance decreases with an increase in the vehicle speed.

Thus, the controller can set the first resistance appropriately adapted to an actual traveling situation.

The first resistance preferably increases with the angular speed of the lean amount of the vehicle body. Thus, the vehicle body can be effectively inhibited from leaning to excess. Here, the controller may be arranged to control the first resistance to increase with the angular speed of the lean amount of the vehicle body. Alternatively, the resistance applying mechanism may be constructed to have such a characteristic that the first resistance generated increases with the angular speed of the lean amount of the vehicle body. The resistance applying mechanism may be realized with a damper body, for example.

The body leaning control system preferably also includes an angular speed acquiring device arranged to detect information on an angular speed of the lean amount of the vehicle body, wherein the controller is arranged to perform control, based on detection results received from the vehicle speed detecting device and the angular speed acquiring device, to set the first resistance to include a region where the first resistance increases with the vehicle speed at the same angular speed of the lean amount, and to include a region where the first resistance increases with the angular speed of the lean amount at the same vehicle speed.

Thus, it is possible to set the first resistance appropriately adapted to an actual traveling situation.

The resistance of the resistance applying mechanism preferably is set to the first resistance when the lean amount of the vehicle body exceeds the first angle and when the lean amount of the vehicle body is not decreasing.

The lean amount of the vehicle body preferably is an absolute value of an angle to which the vehicle body having rotated about an axis extending longitudinally of the vehicle body from a neutral position where an up-and-down direction of the vehicle body is parallel to a substantially vertical direction.

Thus, the lean amount of the vehicle body can be determined accurately regardless of traveling surface conditions, for example.

The controller preferably is arranged to determine, based on detection results received from the lean amount acquiring device, whether the lean amount of the vehicle body is varying in a direction in which the vehicle body returns to the neutral position, and to make a change to a third resistance weaker than the first resistance when the vehicle body is returning to the neutral position even when the lean amount of the vehicle body exceeds the first angle. As a result, it is possible to permit the vehicle body to return to the neutral position relatively easily.

It is also preferred that the third resistance has a substantially minimum value of the resistance of the resistance applying mechanism so that it is possible to permit the vehicle body to return to the neutral position very easily.

The damper body preferably is a rotary type having a first member and a second member rotatable relative to each other about a common axis, and is attached to a rotary shaft of the balancer mechanism, to allow for easy and convenient construction.

The support mechanism preferably includes a right swing arm rotatable relative to the vehicle body about an axis extending transversely of the vehicle body to move up and down a right traveling member of the pair of traveling members, and a left swing arm rotatable relative to the vehicle body about the axis extending transversely of the vehicle body to move up and down a left traveling member of the pair of traveling members; the resistance applying mechanism includes a pair of cylinder type damper bodies arranged between the right swing arm and the vehicle body and between the left swing arm and the vehicle body, to damp each rotation of the right swing arm and the left swing arm, and an adjusting element arranged to interlock amounts of extension and contraction of the pair of cylinder type damper bodies so that up-and-down motions of the right traveling member and the left traveling member take place in opposite directions and in corresponding amounts, and to vary resistance of each of the cylinder type damper bodies; and the controller is arranged to control strength of the resistance to each rotation of the right swing arm and the left swing arm by driving the adjusting element. This allows the resistance applying mechanism to be constructed conveniently and easily.

The resistance applying mechanism preferably includes a first member and a second member movable relative to each other, a working fluid for damping relative movement between the first member and the second member, and an adjusting element arranged to vary a damping force of the working fluid, one of the first member and the second member being connected to the vehicle body, and the other connected to the pair of traveling members; and the controller is arranged to control a strength of the resistance of the resistance applying mechanism by driving the adjusting element.

The adjusting element is preferably arranged to vary at least one of flow resistance and viscosity of the working fluid.

It is preferred that the working fluid is hydraulic oil or a magnetic fluid.

Thus, the resistance applying mechanism can be constructed easily and conveniently.

Other features, elements, steps, characteristics and advantages of the present invention will become more apparent from the following detailed description of preferred embodiments of the present invention with reference to the attached drawings.

BRIEF DESCRIPTION OF THE DRAWINGS

For the purpose of illustrating the present invention, there are shown in the drawings several forms which are presently preferred, it being understood, however, that the present invention is not limited to the precise arrangement and instrumentalities shown.

FIG. 5 is a perspective view showing the principal portion of the saddle riding type vehicle.

FIG. 7 is a perspective view of the principal portion showing the leaning state of the saddle riding type vehicle.

DETAILED DESCRIPTION OF PREFERRED EMBODIMENTS

Preferred embodiments of the present invention will be described in detail hereinafter with reference to the drawings.

Figure 1:
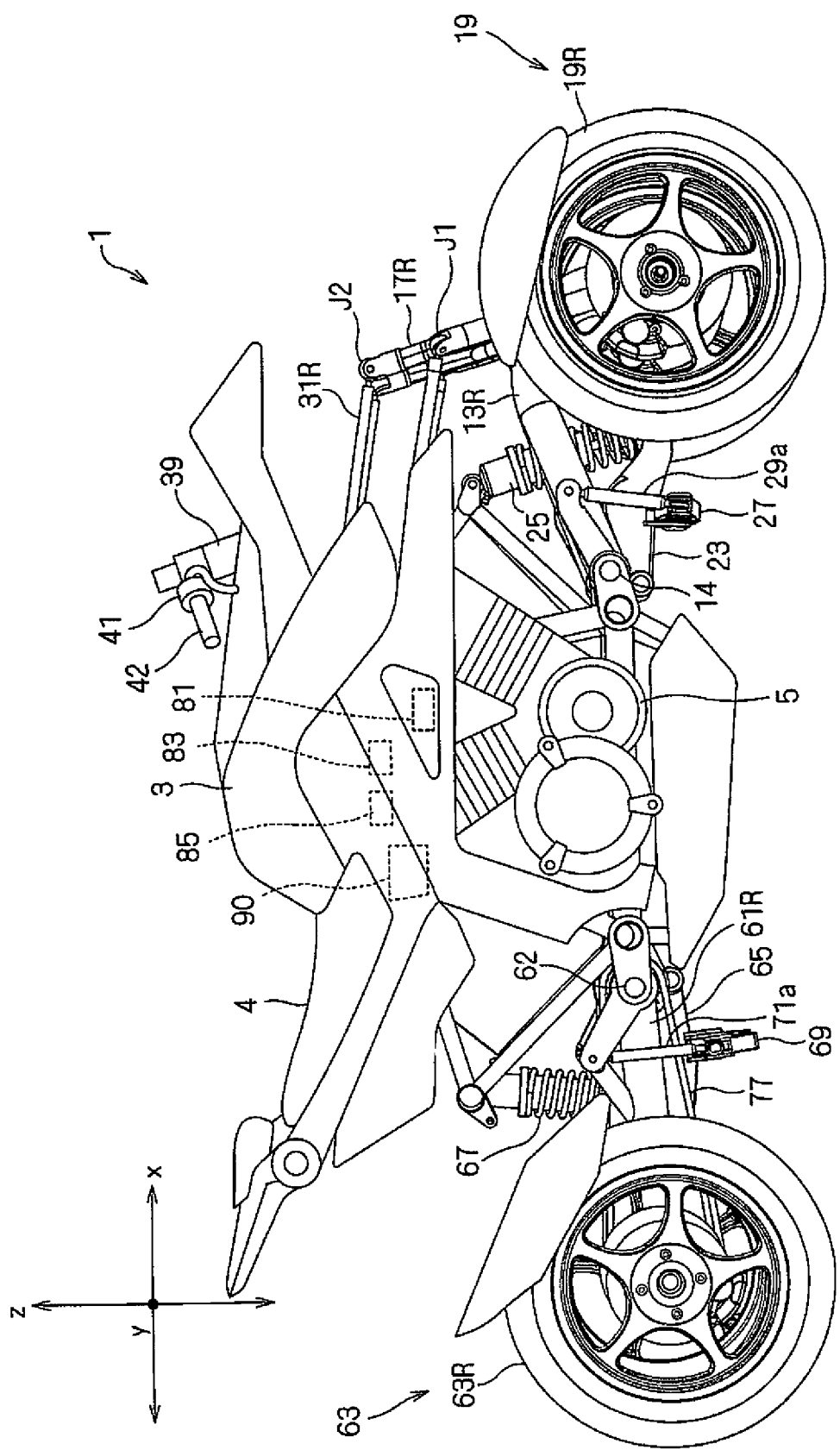
FIG. 1 is a side view showing an outward appearance of a saddle riding type vehicle according to a preferred embodiment of the present invention.
Figure 2:
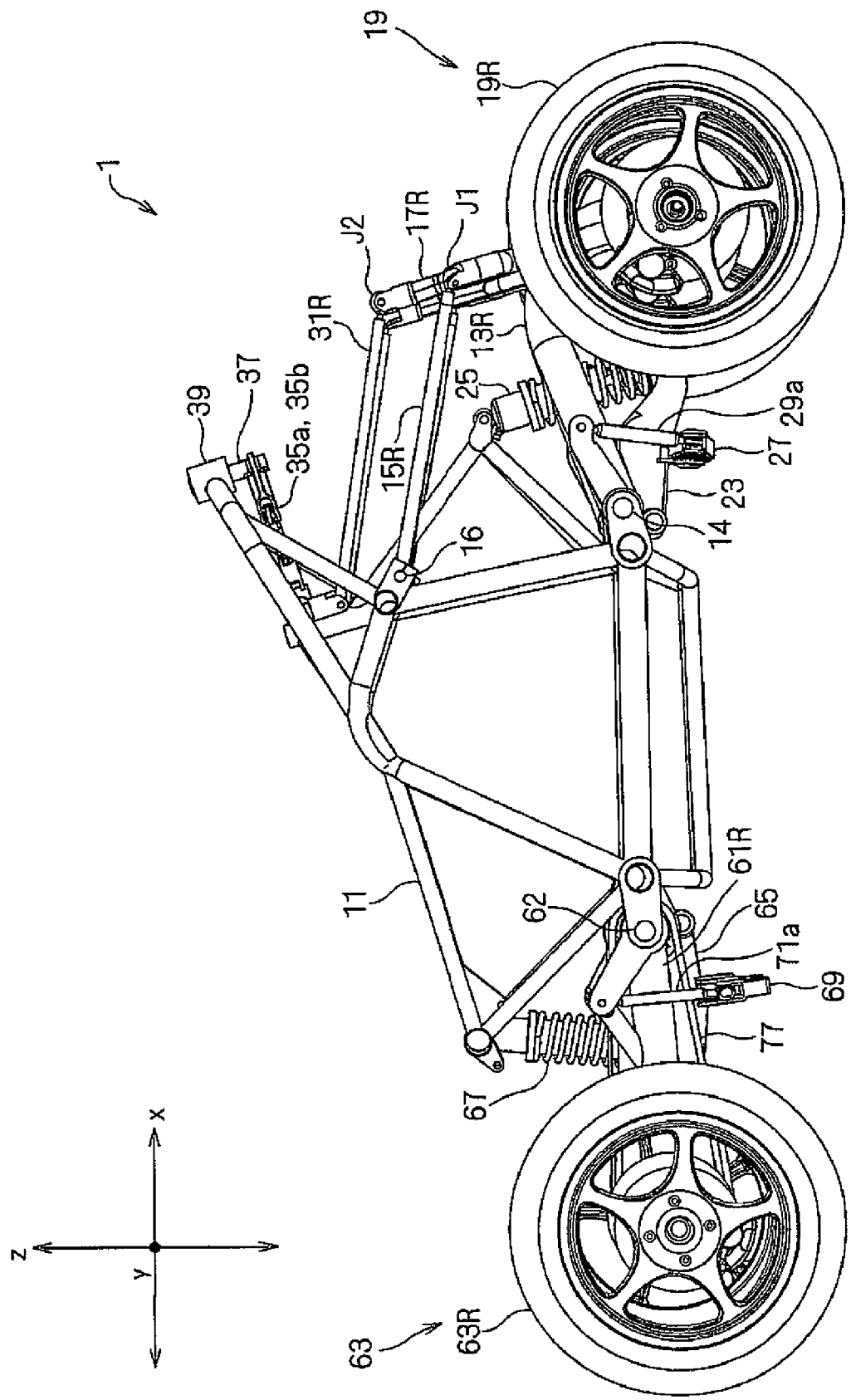
FIG. 2 is a side view showing an outline construction of the saddle riding type vehicle according to a preferred embodiment of the present invention.
Figure 3:
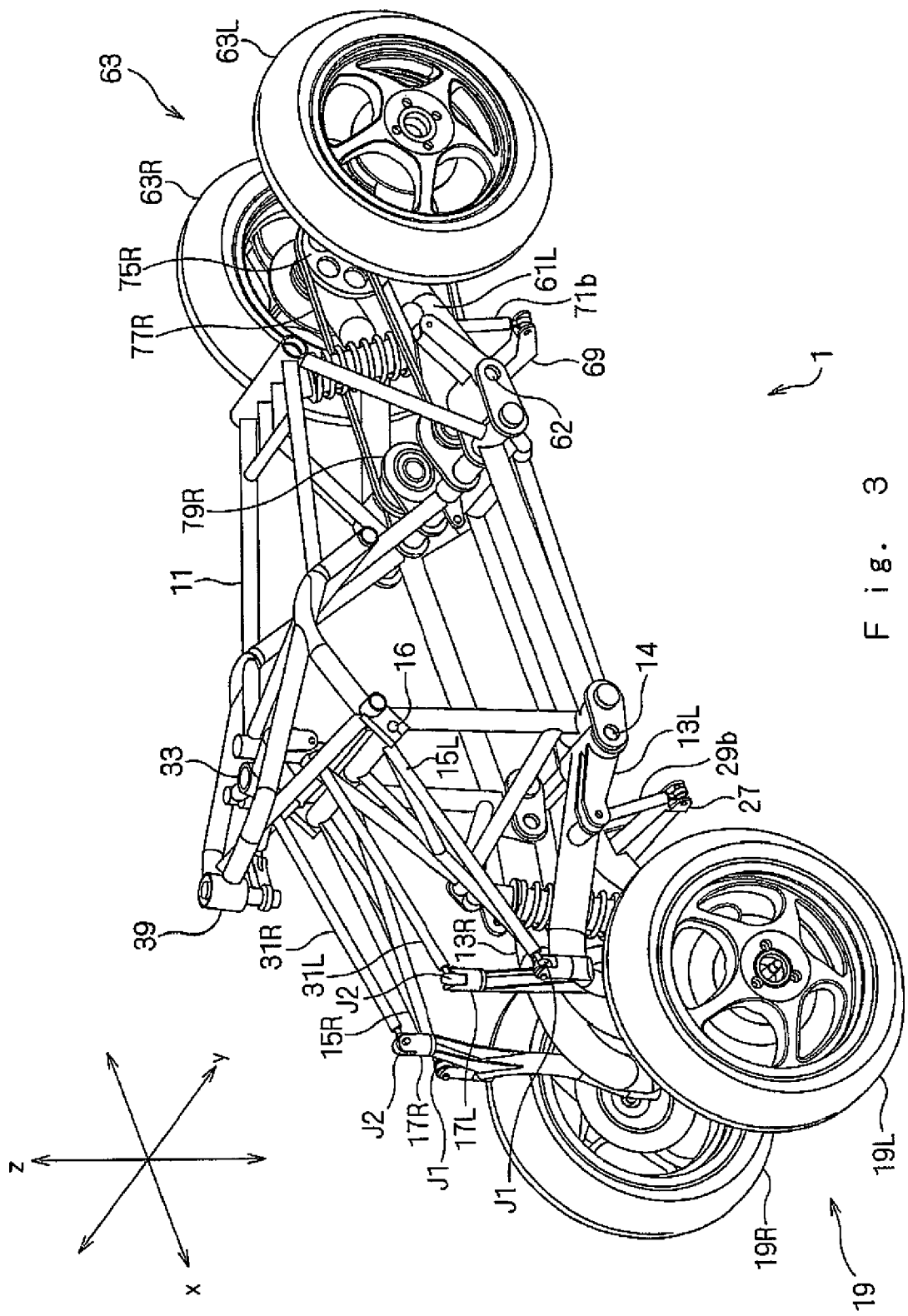
FIG. 3 is a perspective view showing an outline construction of the saddle riding type vehicle according to a preferred embodiment of the present invention.
Figure 4:
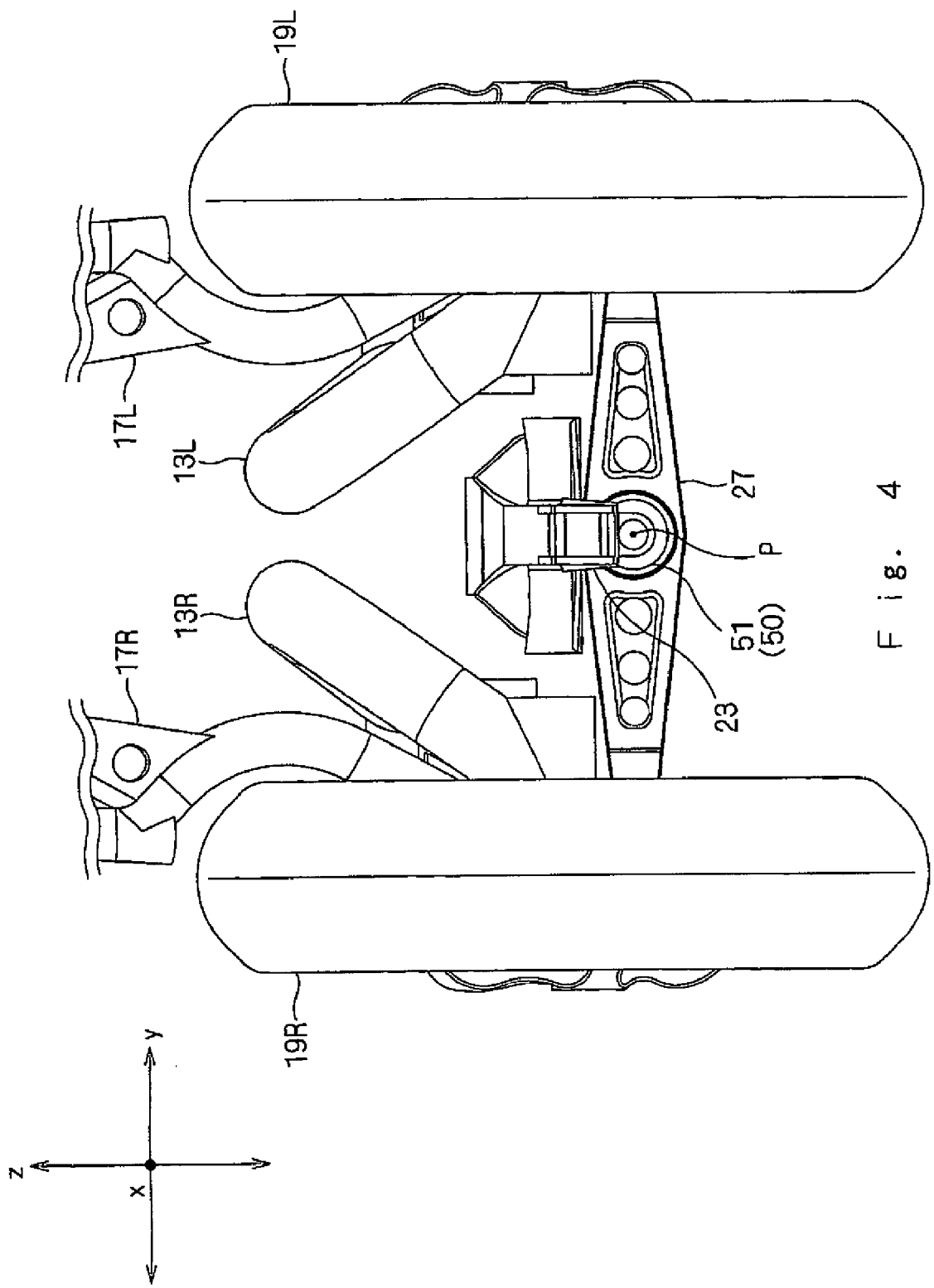
FIG. 4 is a front view of a principal portion of the saddle riding type vehicle.

FIG. 1 is a side view showing an outward appearance of a saddle riding type vehicle according to a preferred embodiment of the present invention. FIG. 2 is a side view showing an outline construction of the saddle riding type vehicle. FIG. 3 is a perspective view showing an outline construction of the saddle riding type vehicle. FIG. 4 is a front view of a principal portion of the saddle riding type vehicle. FIG. 5 is a perspective view of the principal portion of the saddle riding type vehicle. In the following description, the "right" and "left" refer to the sides seen from the rider seated on the saddle riding type vehicle. In FIGS. 1 and 2, the right side of the drawings corresponds to the front of the saddle riding type vehicle 1. In FIG. 3, the left side of the drawing corresponds to the front of the saddle riding type vehicle 1.

Referring mainly to FIGS. 1 through 3, the saddle riding type vehicle 1 in this preferred embodiment preferably is an automotive four-wheeled vehicle having pairs of wheels at the front and rear of a vehicle body, respectively. The saddle riding type vehicle 1 has a main frame 11 with a down tube and a seat frame. The main frame 11 includes a head pipe 39 attached to a forward end thereof. The head pipe 39 rotatably supports a steering shaft 37. A handlebar 41 is attached to the upper end of the steering shaft 37. A fuel tank 3 is mounted on the main frame 11 rearward of the handlebar 41, and a seat 4 is mounted in a further rearward position. An engine 5 is mounted on the main frame 11 below the fuel tank 3.

In the following description, this main frame 11 and components (e.g., the seat 4) rigidly secured to the main frame 11 will be referred to as a "vehicle body" where appropriate. In the drawings, the x-direction is the longitudinal direction of the vehicle body, the y-direction is the transverse direction of the vehicle body, and the z-direction is the up-and-down direction of the vehicle body. The longitudinal direction, transverse direction and up-and-down direction of the vehicle body are perpendicular to one another. When the vehicle body stands upright, the longitudinal direction and transverse direction of the vehicle body are horizontal, respectively, and the up-and-down direction of the vehicle body is vertical.

Construction Relating to the Front Wheels

1. Support Mechanisms—Right Side and Left Side Support Mechanisms

Referring to FIG. 3, the main frame 11 has, attached to lower front positions thereof, a lower right swing arm 13R and a lower left swing arm 13L arranged transversely and extending forward of the vehicle body. Similarly, the main frame 11 has, attached to upper front positions thereof, an upper right swing arm 15R and an upper left swing arm 15L arranged transversely and extending forward of the vehicle body. One end of each of the lower right swing arm 13R and lower left swing arm 13L is supported by the main frame 11 to be rotatable about a lower pivot shaft 14. One end of each of the upper right swing arm 15R and upper left swing arm 15L is supported by the main frame 11 to be rotatable about an upper pivot shaft 16. The lower pivot shaft 14 and upper pivot shaft 16 extend substantially parallel to the transverse direction, respectively.

A right front tube 17R is connected to the other end of the lower right swing arm 13R. The right front tube 17R extends obliquely upward, and is in a substantially middle position thereof connected to the other end of the upper right swing arm 15R. A right wheel 19R is rotatably supported by a lower portion of the right front tube 17R. The construction is selected and designed such that joints at which the right front tube 17R is connected to the lower right swing arm 13R and upper right swing arm 15R, respectively, and positions of the lower pivot shaft 14 and upper pivot shaft 16, substantially correspond to the vertexes of a parallelogram in side view.

With the lower right swing arm 13R and upper right swing arm 15R rotating in forward and reverse directions about the lower pivot shaft 14 and upper pivot shaft 16, respectively, the right front tube 17R moves substantially up and down along the vehicle body. Consequently, the right wheel 19R moves up and down relative to the vehicle body.

A left front tube 17L and a left wheel 19L are constructed similarly to the right front tube 17R and right wheel 19R. The right wheel 19R and left wheel 19L arranged at opposite sides of the vehicle body as described above will be called collectively hereinafter the "right and left wheels 19" or the "pair of wheels" where appropriate. The right and left wheels 19 (right wheel 19R and left wheel 19L) correspond to the traveling members according to a preferred embodiment of the present invention.

Figure 6:
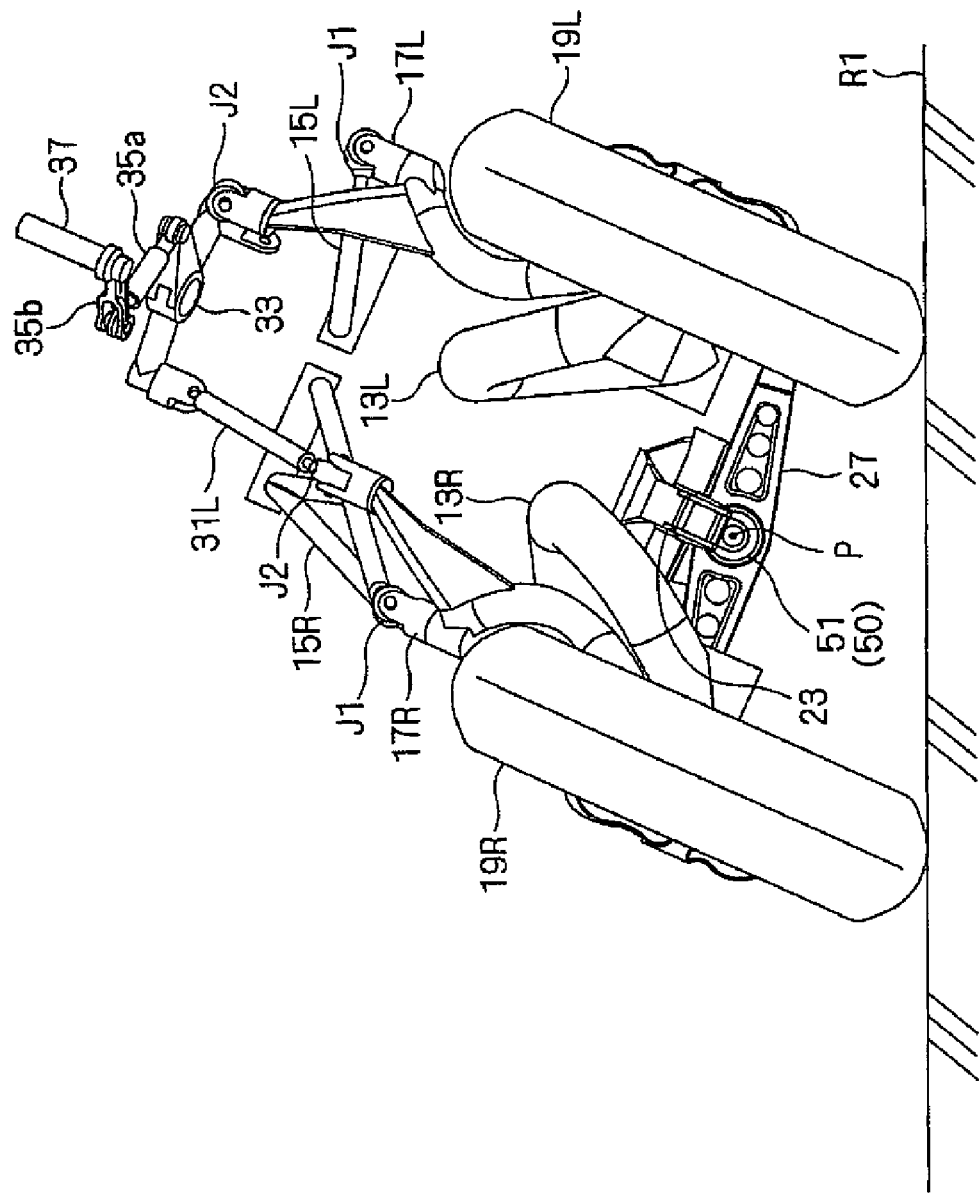
FIG. 6 is a front view of the principal portion showing a leaning state of the saddle riding type vehicle.

FIG. 6 is a front view of the principal portion showing a leaning state of the saddle riding type vehicle 1. FIG. 7 is a perspective view of the principal portion showing the leaning state of the saddle riding type vehicle 1. As shown, when the saddle riding type vehicle 1 is leaned to the left side in a traveling direction relative to a flat traveling surface R1, the right wheel 19R lowers relative to the vehicle body, and the left wheel 19L rises relative to the vehicle body, whereby the right wheel 19R and left wheel 19L are maintained in contact with the traveling surface R1, respectively. With a forward movement (onward from the plane of FIG. 6) in the state of the pair of right wheel 19R and left wheel 19L contacting the traveling surface R1, the saddle riding type vehicle 1 will turn left (rightward in FIG. 6).

The lower right swing arm 13R, upper right swing arm 15R and right front tube 17R correspond to the right side support mechanism according to a preferred embodiment of the present invention. The lower left swing arm 13L, upper left swing arm 15L and left front tube 17L correspond to the left side support mechanism according to a preferred embodiment of the present invention.

2. Support Mechanism—Balancer Mechanism

Referring mainly to FIG. 4, between and slightly below the lower right swing arm 13R and lower left swing arm 13L, a front carrier beam 23 is integrally supported by the main frame 11 to extend forward of the vehicle body. The front carrier beam 23 is further connected through a front suspension 25 to a central portion at the forward end of the main frame 11. The front carrier beam 23 supports a front balancer beam 27 to be rotatable about a shaft (hereinafter referred to as the "rotary shaft" where appropriate) extending substantially longitudinally of the vehicle body. A damper body 51, to be described hereinafter, is provided on the rotary shaft connecting the front carrier beam 23 and front balancer beam 27.

As shown in FIG. 5, the front balancer beam 27 extends transversely of the vehicle body, and has lower ends of rods 29a and 29b pivotably connected to opposite ends thereof. The upper ends of the rods 29a and 29b are pivotably connected to the lower right swing arm 13R and lower left swing arm 13L, respectively.

When, for example, the lower right swing arm 13R rotates about the lower pivot shaft 14 to lower the right wheel 19R and depress the rod 29a, the front balancer beam 27 rotates to raise the other rod 29b and push up the lower left swing arm 13L. As a result, the left wheel 19L moves up by an amount corresponding to the descent of the right wheel 19R. Thus, the right wheel 19R and left wheel 19L move up and down in equal amounts in substantially opposite directions relative to the vehicle body.

The front carrier beam 23, front suspension 25, front balancer beam 27 and rods 29a and 29b correspond to the balancer mechanism according to a preferred embodiment of the present invention. The right side support mechanism, left side support mechanism and balancer mechanism associated with the right and left wheels 19 at the front of the vehicle body noted above correspond to the support mechanism according to a preferred embodiment of the present invention.

3. Steering Mechanism

Referring to FIGS. 5 and 7, a ball joint J1 is preferably used as each of the joint between the right front tube 17R and lower right swing arm 13R and the joint between the right front tube 17R and upper right swing arm 15R. The ball joint J1 coupling the right front tube 17R and lower right swing arm 13R is not shown in the drawings. Thus, the right front tube 17R is supported by the lower right swing arm 13R and upper right swing arm 15R to be rotatable about an axis extending through the upper and lower joints.

Further, the right front tube 17R has a right steering rod 31R interlocked thereto. The right steering rod 31R is connected to the upper end of the right front tube 17R, which is offset from the axis extending through the joints noted above. A ball joint J2 is preferably used as the joint between the right front tube 17R and right steering rod 31R. The left front tube 17L and a left steering rod 31L interlocked thereto are arranged similarly to the above.

The other ends of the right steering rod 31R and left steering rod 31L are connected to a front bar 33, respectively. The front bar 33 has a central portion supported by the main frame 11 to be rotatable about an axis extending substantially vertically of the vehicle body, and two arms extending from this central portion substantially transversely of the vehicle body. The other ends of the right steering rod 31R and left steering rod 31L are connected to distal ends of these arms, respectively.

The front bar 33 further includes one arm extending from the central portion thereof obliquely forward of the vehicle body. This arm is connected to the lower end of the steering shaft 37 through link members 35a and 35b. The steering shaft 37 extends through, and rotatably supported, by the head pipe 39 provided in an uppermost position at the forward end of the main frame 11. The handlebar 41 is fixed to the upper end of the steering shaft 37. The handlebar 41 includes an accelerator grip 42.

When the handlebar 41 is turned, the link members 35a and 35b will bend and stretch to rotate the front bar 33. As a result, the right steering rod 31R and left steering rod 31L move in opposite directions substantially longitudinally of the vehicle body. The right front tube 17R and left front tube 17L rotate to give a steering angle to the right wheel 19R and left wheel 19L.

4. Resistance Applying Mechanism

Figure 8:
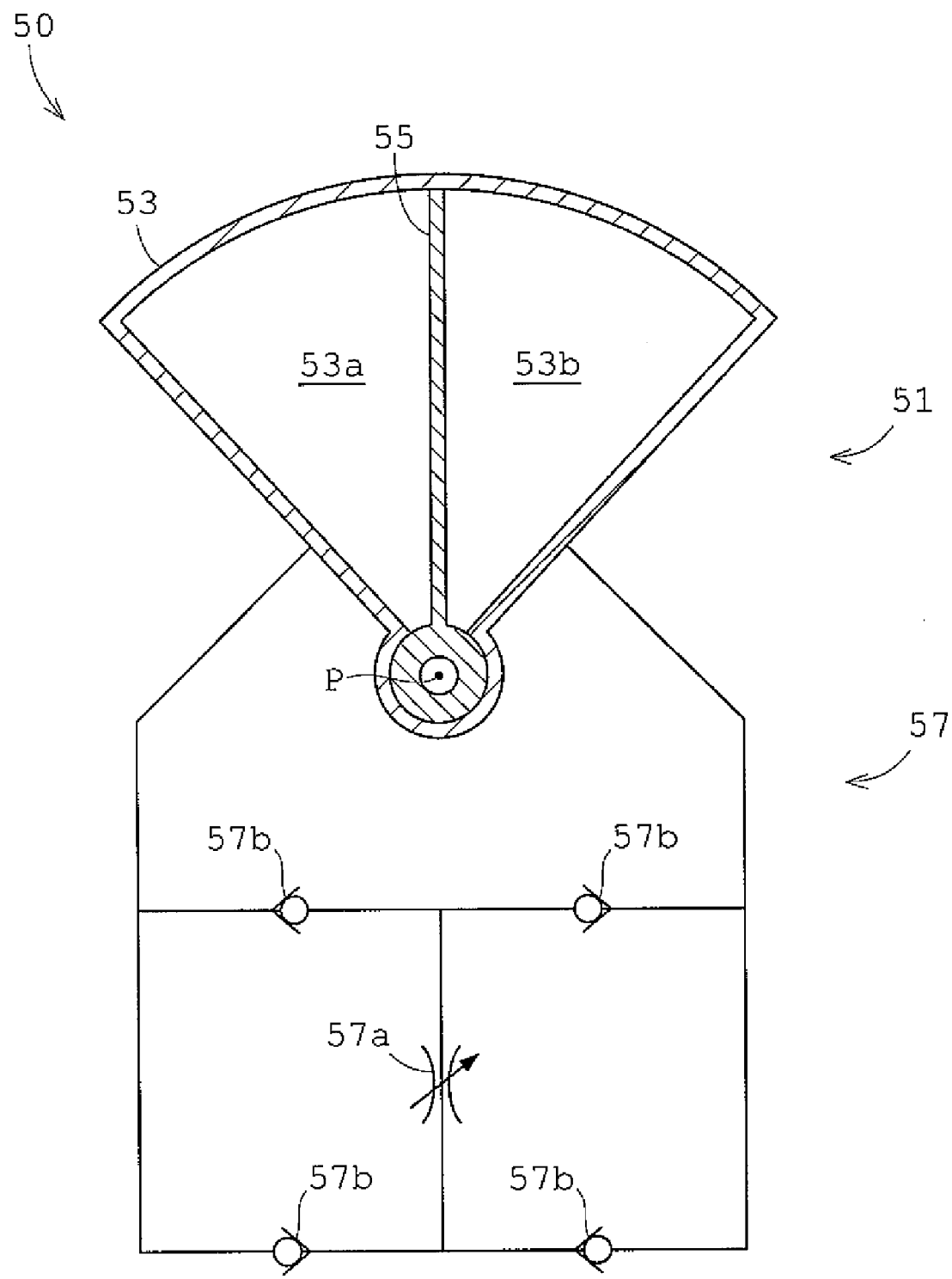
FIG. 8 is a schematic view of a resistance applying mechanism.

Reference is made to FIG. 8. FIG. 8 is a schematic view of a resistance applying mechanism. As shown, a resistance applying mechanism 50 includes a damper body 51 arranged to generate a damping force, and a hydraulic circuit 57 provided for the damper body 51.

The damper body 51 preferably is what is called the rotary type. That is, the damper body 51 has a housing 53 defining a space therein, and a partition member 55 swingable about an axis P relative to the housing 53 and dividing the interior space of the housing 53 into two oil chambers 53a and 53b.

This damper body 51 is provided on the rotary shaft of the balancer mechanism as noted hereinbefore. More particularly, the housing 53 is rigidly attached to the front carrier beam 23, and the partition member 55 is rigidly attached to the front balancer beam 27, to have the axis P in alignment with the rotary shaft of the front balancer beam 27. The housing 53 and partition member 55 correspond to the first member and second member, respectively, according to a preferred embodiment of the present invention. The hydraulic circuit 57, as shown in FIG. 8, preferably includes a variable throttle valve 57a and four check valves 57b arranged between the oil chambers 53a and 53b, for allowing hydraulic oil to flow to and from the oil chamber 53a and oil chamber 53b only through the variable throttle valve 57a. The variable throttle valve 57a serves to vary the flow resistance of the hydraulic oil. The hydraulic oil corresponds to the working fluid according to a preferred embodiment of the present invention.

When the front balancer beam 27 rotates relative to the front carrier beam 23 (vehicle body), the partition member 55 swings relative to the housing 53. Then, one of the oil chambers 53a and 53b diminishes and the other enlarges, while the hydraulic oil flows between the oil chamber 53a and 53b through the variable throttle valve 57a. The flow resistance of this hydraulic oil serves as the damping force for damping relative movement between the housing 53 and partition member 55, which in turn serves as a resistance to rotation of the front balancer beam 27. The strength of this resistance (damping force) is adjusted by the variable throttle valve 57a. The resistance is variable with the rotating speed of the front balancer beam 27, such that the higher rotating speed of the front balancer beam 27 results in the stronger resistance. The variable throttle valve 57a corresponds to the adjusting element according to a preferred embodiment of the present invention.

Construction Relating to the Rear Wheels

1. Support Mechanisms—Right Side and Left Side Support Mechanisms

Reference is made to FIGS. 2 and 3. The main frame 11 has, attached to lower rear positions thereof, a right rear swing arm 61R and a left rear swing arm 61L arranged transversely and extending rearward of the vehicle body. The right rear swing arm 61R and left rear swing arm 61L are supported by the main frame 11 to be rotatable about rear pivot shafts 62, respectively. The right rear swing arm 61R has, rotatably supported at a rear end thereof, a drive shaft (not shown) extending transversely of the vehicle body. A right wheel 63R is connected to the drive shaft.

With the right rear swing arm 61R rotating in opposite directions about the rear pivot shaft 62, the right wheel 63R moves up and down relative to the vehicle body. The construction of the support mechanism relating to the left rear swing arm 61L (a drive shaft and a left wheel 63L) is similar to that of the right rear swing arm 61R.

In the following description, the right wheel 63R and left wheel 63L arranged at opposite sides of the vehicle body will be collectively called the "right and left wheels 63" or the "pair of wheels" where appropriate. The right and left wheels 63 (right wheel 63R and left wheel 63L) correspond to the traveling members according to a preferred embodiment of the present invention. The right rear swing arm 61R and left rear swing arm 61L correspond to the right support mechanism and left support mechanism, respectively, according to a preferred embodiment of the present invention.

2. Support Mechanism—Balancer Mechanism

Referring to FIG. 2, between the right rear swing arm 61R and left rear swing arm 61L, a rear carrier beam 65 is integrally supported by the main frame 11 to extend rearward of the vehicle body. The rear carrier beam 65 is further connected through a rear suspension 67 to an upper part at the rear end of the main frame 11.

The rear carrier beam 65 supports a rear balancer beam 69 to be rotatable about a shaft (hereinafter referred to as the "rotary shaft" where appropriate) extending substantially longitudinally of the vehicle body. The rear balancer beam 69 extends transversely of the vehicle body, and has lower ends of rods 71a and 71b pivotably connected to opposite ends thereof. The upper ends of the rods 71a and 71b are interlocked to substantially middle positions of the right rear swing arm 61R and left rear swing arm 61L, respectively.

When, for example, the right rear swing arm 61R rotates relative to the main frame 11 to lower the right wheel 63R and depress the rod 71a, the rear balancer beam 69 rotates to raise the other rod 71b. As a result, the left rear swing arm 61L is pushed up, and the left wheel 63L moves up by an amount corresponding to the descent of the right wheel 63R. Thus, the right wheel 63R and left wheel 63L move up and down in substantially opposite directions relative to the vehicle body, whereby the right wheel 63R and left wheel 63L contact the traveling surface R1, respectively.

The rear carrier beam 65, rear suspension 67, rear balancer beam 69 and rods 71a and 71b correspond to the balancer mechanism according to a preferred embodiment of the present invention. The above-noted right side support mechanism and left side support mechanism corresponding to the right and left rear wheels 63 and the balancer mechanism correspond to the support mechanism according to a preferred embodiment of the present invention.

3. Drive Mechanism

Reference is made to FIG. 3. A driven sprocket 75R is connected to the drive shaft rotatably supported by the right rear swing arm 61R. A chain 77R is wound around the driven sprocket 75R. The chain 77R is further wound around a drive sprocket 79R. The driving force of the engine 5 (see FIG. 1) is transmitted to the drive sprocket 79R.

The drive sprocket 79R is rotated by the driving force of the engine 5 transmitted thereto, to rotate the driven sprocket 75R through the chain 77R. As a result, the drive shaft and right wheel 63R rotate with the driven sprocket 75R.

The construction of the drive mechanism (the driven sprocket, chain and drive sprocket (with the signs omitted from FIG. 3 for expediency of illustration)) relating to the left rear swing arm 61L is the same as that of the right rear swing arm 61R.

Detectors

Figure 9:
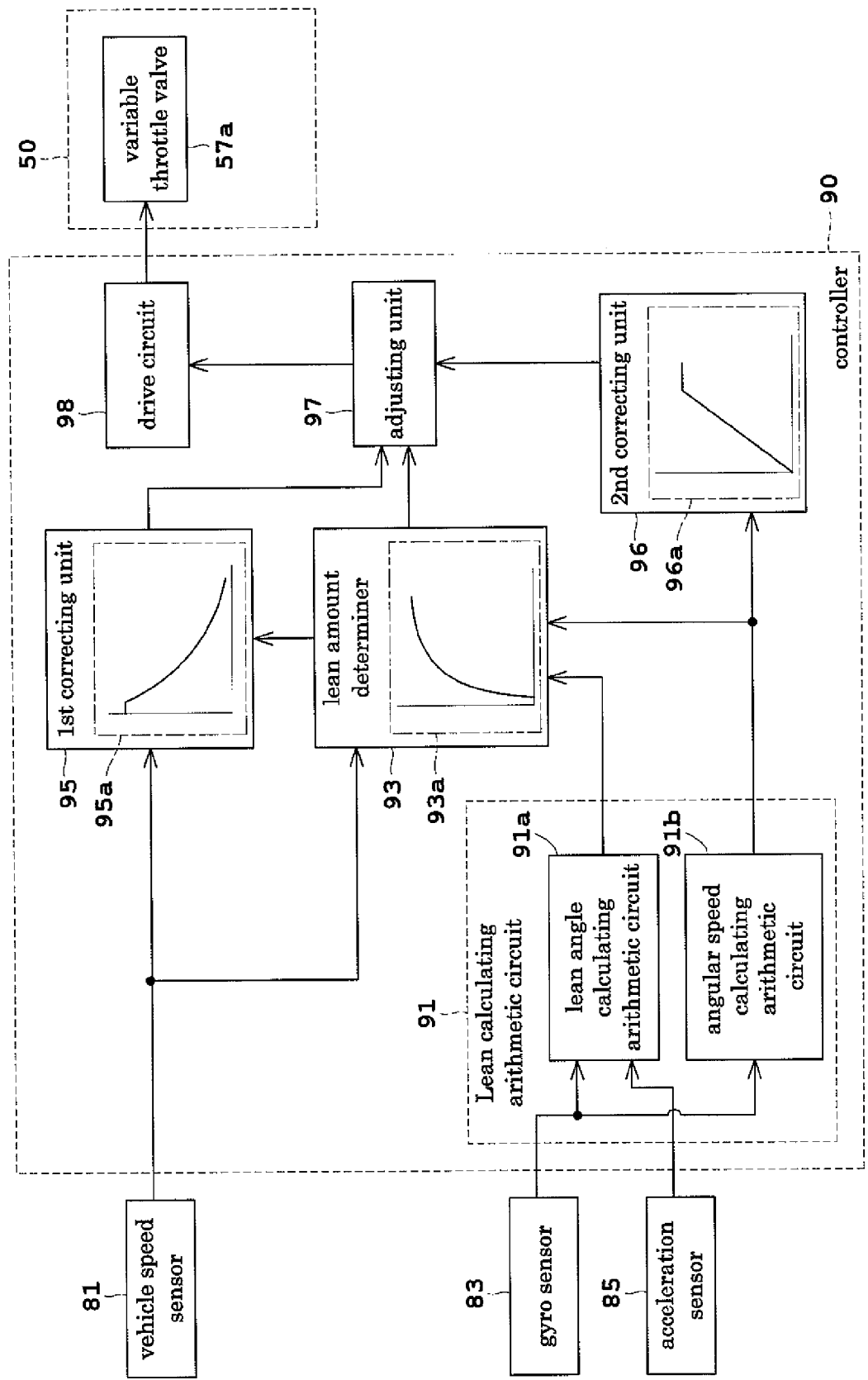
FIG. 9 is a block diagram showing an outline construction of a control system.

The saddle riding type vehicle 1 includes a speed sensor 81, a gyro sensor 83 and an acceleration sensor 85 (see FIGS. 1 and 9).

The speed sensor 81 detects vehicle speed. The speed sensor 81 corresponds to the vehicle speed detecting device according to a preferred embodiment of the present invention.

The gyro sensor 83 detects angular speeds of the vehicle body rolling about an x-axis (an axis extending longitudinally of the vehicle body). A value integrating the angular speeds corresponds to an angle of the vehicle body having rolled about the x-axis.

Figure 10B:
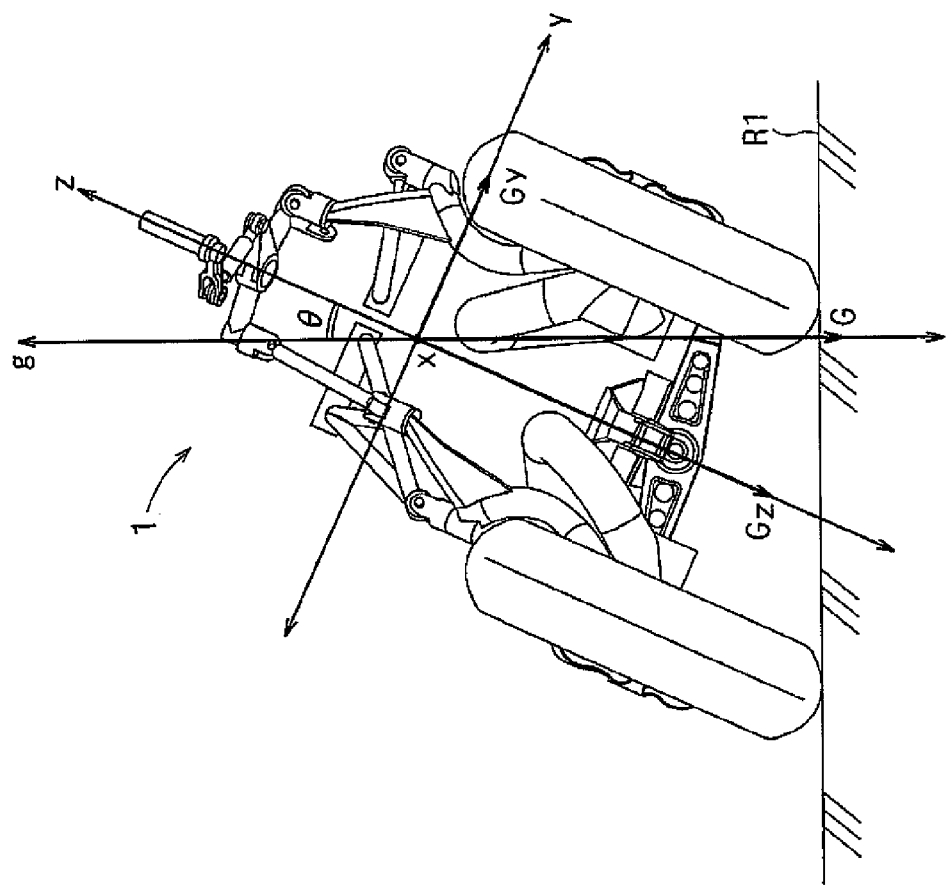
FIG. 10B is a view showing a leaning angle of the vehicle body.

The acceleration sensor 85 detects a component Gy in a y-direction (transverse direction of the vehicle body) of acceleration due to gravity G as shown in FIG. 10B. FIG. 10B is a view showing a lean angle. In FIG. 10B, sign "g" indicates a direction of acceleration due to gravity G, i.e. the vertical direction, and sign "Gz" indicates a component in a z-direction (up-and-down direction of the vehicle body) of acceleration due to gravity G. The component Gy varies with an angle formed between the vertical direction g and y-direction. A value of component Gy corresponds to the angle of the vehicle body having rolled about the x-axis. As seen from FIG. 10B, the component Gz also varies with an angle formed between the vertical direction g and z-direction. A value of component Gz also corresponds to the angle of the vehicle body having rolled about the x-axis.

Here, the angle formed between the up-and-down direction of the vehicle body (z-direction) and the vertical direction g (which angle is affixed with sign "θ" in FIG. 10B; θ=0 in FIG. 10A and thus sign "θ" is not shown therein) is regarded as the "lean angle of the vehicle body". An absolute value of the "lean angle of the vehicle body" is regarded as the "lean amount of the vehicle body". In other words, the "lean angle of the vehicle body" can be called an angle of the up-anddown direction of the vehicle body (z-direction) inclined right or left relative to the vertical direction g, and can also be called an angle of the vehicle body having rolled about the axis extending longitudinally of the vehicle body (x-direction), provided that a neutral position in which the up-and-down direction of the vehicle body (z-direction) is parallel to the vertical direction g is "0 degree".

The angular speed detected by the gyro sensor 83 is information on an angular speed of the lean amount of the vehicle body, and information on the lean amount of the vehicle body. The component Gy detected by the acceleration sensor 85 is information on the lean amount of the vehicle body. The gyro sensor 83 and acceleration sensor 85 correspond to the lean amount acquiring device according to a preferred embodiment of the present invention. The gyro sensor 83 corresponds also to the angular speed acquiring device according to a preferred embodiment of the present invention.

Controller

FIG. 9 is a block diagram showing an outline construction of a control system provided for the saddle riding type vehicle 1. A controller 90 includes a lean calculating arithmetic circuit 91, a lean amount determiner 93, a first correcting unit 95, a second correcting unit 96, an adjusting unit 97 and a drive circuit 98. The controller 90 preferably includes a central processing unit (CPU) arranged to perform various processes and a storage medium, or a microcomputer. The storage medium stores in advance a determination table 93a for comparison with detection results of each detecting device, a first correction table 95a and a second correction table 96a (described hereinafter).

1. Lean Calculating Arithmetic Circuit 91

The lean calculating arithmetic circuit 91 is functionally divided into a lean angle calculating arithmetic circuit 91a and an angular speed calculating arithmetic circuit 91b. The lean calculating arithmetic circuit 91 receives detection results from the gyro sensor 83 and acceleration sensor 85.

The lean angle calculating arithmetic circuit 91a calculates an angle of rolling about the x-axis of the vehicle body by integrating angular speeds which are detection results of the gyro sensor 83, and calculates a lean angle of the vehicle body by applying an appropriate offset value thereto. Similarly, the lean angle calculating arithmetic circuit 91a calculates a lean angle of the vehicle body based on the component Gy which is a detecting result of the acceleration sensor 85. The lean angle calculating arithmetic circuit 91a carries out a correction process based on the two calculated lean angles of the vehicle body, to obtain a lean angle of the vehicle body with increased accuracy.

Figure 10A:
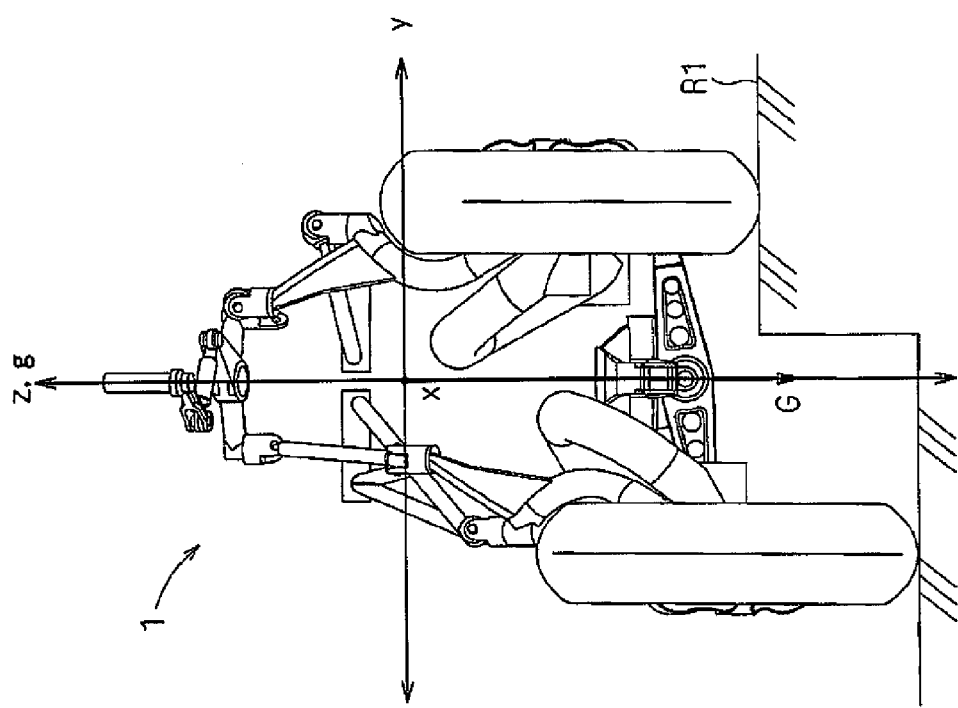
FIG. 10A is a view showing a leaning angle of a vehicle body.

Reference is made to FIGS. 10A and 10B. As seen from FIGS. 10A and 10B, even though the positional relationships between the vehicle body and the right and left wheels 19 (particularly the distance between the vehicle body and right wheel 19R and the distance between the vehicle body and left wheel 19L) are the same, positions of the vehicle body are different when conditions of the traveling surface R1 are different, such that the vehicle body is in the neutral position in FIG. 10A, while the vehicle body is leaning leftward in FIG. 10B. Even in such a case, with the lean angle obtained by the lean angle calculating arithmetic circuit 91a, a lean of the vehicle body can be determined accurately regardless of conditions and the like of the traveling surface R1.

In this preferred embodiment, the lean angle obtained by the lean angle calculating arithmetic circuit 91a can take positive and negative values. If, for example, the lean angle is positive when the vehicle body leans to the right side, then the lean angle has a negative value when the vehicle body leans to the left side.

The angular speed calculating arithmetic circuit 91b obtains an angular speed of the lean angle from the detection results of the gyro sensor 83. The process of the angular speed calculating arithmetic circuit 91b is not limited to this. For example, the angular speed calculating arithmetic circuit 91b may be constructed to calculate an angular speed of the lean angle through a differentiation process of the lean angle obtained by the lean angle calculating arithmetic circuit 91a. In this case, since the detection result of the acceleration sensor 85 is also information on the angular speed of the lean amount of the vehicle body, the gyro sensor 83 and acceleration sensor 85 correspond to the angular speed acquiring device according to a preferred embodiment of the present invention.

2. Lean Amount Determiner 93

The lean amount determiner 93 determines whether the lean amount of the vehicle body which is a degree (absolute value) of the lean angle has exceeded a first angle. The lean amount determiner 93 determines also whether the lean amount of the vehicle body is decreasing. Further, the lean amount determiner 93 determines whether the resistance generated by the resistance applying mechanism 50 according to the results of determination should be a first resistance, a second resistance or a third resistance. Each process of the lean amount determiner 93 will particularly be described hereinafter.

The lean amount determiner 93 receives the lean angle and the angular speed of the lean angle calculated by the lean calculating arithmetic circuit 91 and a vehicle speed which is a detection result of the vehicle speed sensor 81.

The lean amount determiner 93 refers to the determination table 93a, and sets the first angle based on the vehicle speed detected by the speed sensor 81. The determination table 93a has the first angle set as correlated with vehicle speed. The lean amount determiner 93 sets the first angle correlated with vehicle speed in the determination table 93a. The determination table 93a in this preferred embodiment has the first angle specified beforehand to increase with vehicle speed. The first angle preferably always has positive values.

Figure 11:
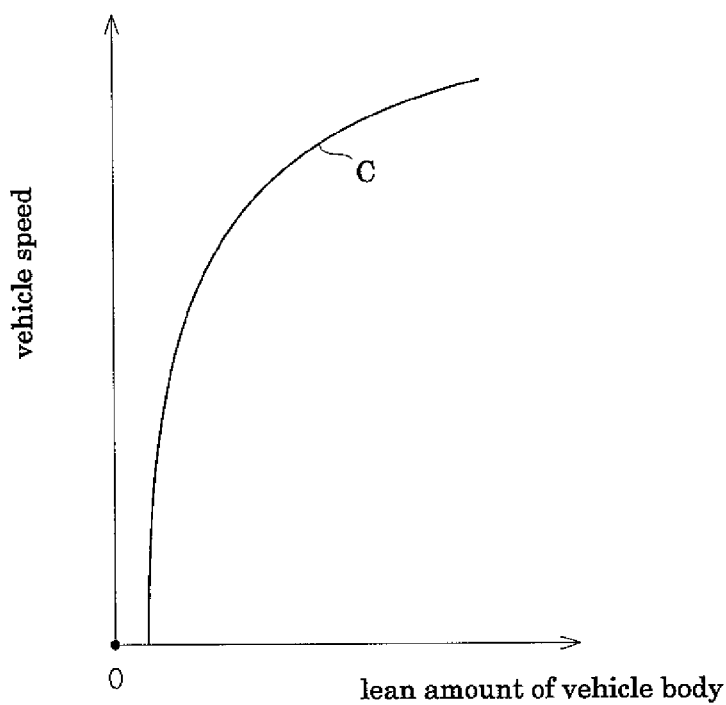
FIG. 11 is a view schematically showing an example of determination table specifying a first angle.

The determination table 93a specifying the first angle will be described with reference to FIG. 11. FIG. 11 is a view schematically showing an example of determination table 93a specifying the first angle. In FIG. 11, the horizontal axis represents the lean amount of the vehicle body while the vertical axis represents vehicle speed. Curve C indicates the first angle. As shown, the lower the vehicle speed is, the smaller is the first angle, and the first angle is set to increase with the vehicle speed.

Such vehicle speed dependence of the first angle will be described. Gravity and centrifugal force act on the saddle riding type vehicle 1 making a turn while leaning the vehicle body. Gravity acts in a direction to increase the lean of the vehicle body of the saddle riding type vehicle 1, while centrifugal force acts in a direction to decrease the lean of the vehicle body. The vehicle body of the saddle riding type vehicle 1 making a turn leans in the direction of a resultant of gravity and centrifugal force. Centrifugal force is variable with the vehicle speed of the saddle riding type vehicle 1, such that centrifugal force becomes stronger as vehicle speed becomes faster. When, for example, vehicle speed becomes slow, the above direction of the resultant will approach the vertical direction, and the lean amount of the vehicle body will become small. If the lean amount of the vehicle body becomes larger than the direction of the resultant, the lean amount of the vehicle body will become still larger due to gravity. Then, the rider has to carry out a return control. The return control requires the rider, for example, to operate the accelerator grip 42 and increase vehicle speed, to turn the handlebar 41 and make the turning radius small, or to change the rider's position and shift the position of the center of gravity.

As will be understood from the relationship between vehicle speed and direction of the resultant, the slower vehicle speed makes the smaller lean amount of the vehicle body enabling a comfortable run. The determination table 93*a* illustrated in FIG. 11 specifies the first angle by taking such speed dependence into consideration.

The lean amount determiner 93 derives a lean amount of the vehicle body from a lean angle inputted thereto, compares the derived lean amount of the vehicle body with the first angle, and determines whether the lean amount of the vehicle body has exceeded the first angle. As noted hereinbefore, in this specification, a "lean amount of the vehicle body" is an absolute value of a lean angle.

The lean amount determiner 93 determines whether the lean amount of the vehicle body is decreasing. When the "lean amount decreases", the vehicle body, whichever of the right and left sides it may be leaning, returns to the neutral position.

Specifically, this determination is made through the following process. The lean amount determiner 93 determines whether the value of the inputted lean angle is positive or negative, and whether the value of the angular speed of the lean angle is positive or negative. In the case of the lean angle determined to have a positive value as a result, the lean amount determiner 93 determines that the lean amount is decreasing when the angular speed of the lean angle is negative, and that the lean amount is not decreasing when the angular speed of the lean angle is not negative. In the case of the lean angle having a negative value, the lean amount determiner 93 determines that the lean amount is decreasing when the angular speed of the lean angle is positive, and that the lean amount is decreasing when the angular speed of the lean angle is not positive.

However, the process for making this determination is not limited to the above example. This determination may be made through the following process, for example. The lean amount determiner 93 derives a lean amount of the vehicle body from a lean angle inputted thereto, and calculates a variation in the lean amount of the vehicle body through a differentiation process of the derived lean amount of the vehicle body. Then, the lean amount determiner 93 determines that the lean amount is decreasing when the variation in the lean amount of the vehicle body is negative. The lean amount determiner 93 determines that the lean amount is not decreasing when the variation in the lean amount of the vehicle body is not negative.

The lean amount determiner 93 determines also a class of resistance to be generated by the resistance applying mechanism 50. Specifically, the lean amount determiner 93 carries out the following process to select one of the first resistance, second resistance and third resistance. The lean amount determiner 93 determines that the resistance generated by the resistance applying mechanism 50 should be the first resistance when the lean amount of the vehicle body is determined to have exceeded the first angle and the lean amount of the vehicle body is determined not to be decreasing. The resistance generated by the resistance applying mechanism 50 is determined to be the second resistance when the lean amount of the vehicle body is determined not to have exceeded the first angle, regardless of whether the lean amount of the vehicle body is decreasing or not. The resistance generated by the resistance applying mechanism 50 is determined to be the third resistance when the lean amount of the vehicle body is determined to have exceeded the first angle and the lean amount of the vehicle body is decreasing.

3. First Correcting Unit 95

The first correcting unit 95 acquires a first factor for correcting the strength of resistance according to vehicle speed. More particularly, the first correcting unit 95 receives vehicle speeds which are detection results of the speed sensor 81. The first correcting unit 95 has a first correction table 95*a* correlating the first factor and vehicle speed, and obtains the first factor based on this first correction table 95*a* and the vehicle speed inputted. The first factor is specified beforehand in the first correction table 95*a* as related to vehicle speed, to include a region where the first factor becomes smaller as the vehicle speed increases.

Figure 12:
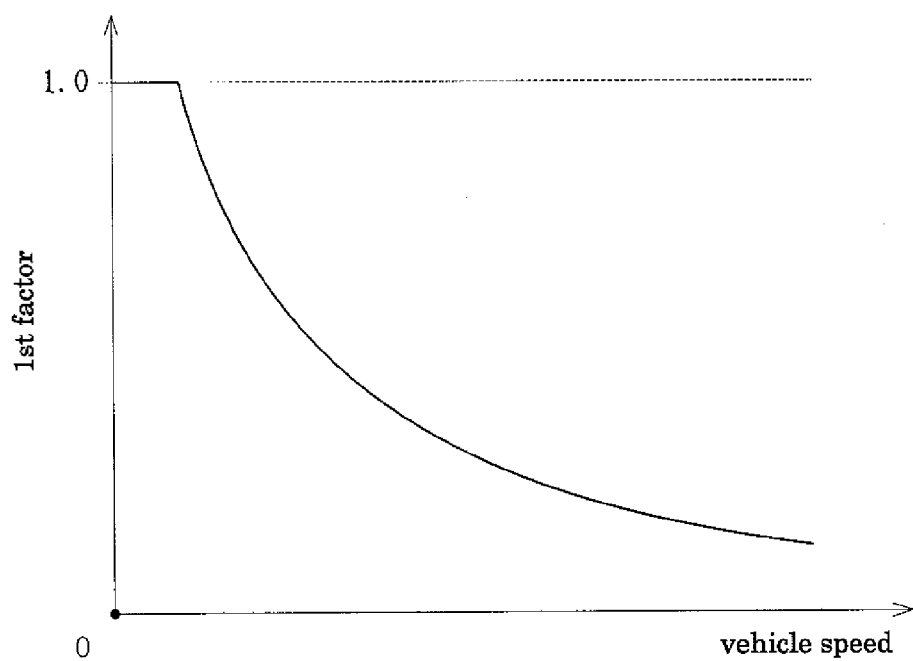
FIG. 12 is a view schematically showing an example of first correction table specifying a first factor.

FIG. 12 is a view schematically showing an example of first correction table 95*a*. In FIG. 12, the horizontal axis represents vehicle speed, while the vertical axis represents the first factor. As shown, this first correction table 95*a* specifies a fixed value (e.g. maximum "1.0") for the first factor in a partial range where vehicle speed is very low. In the other vehicle speed range, the first factor is specified to become small as the vehicle speed becomes fast.

4. Second Correcting Unit 96

The second correcting unit 96 acquires a second factor for correcting the strength of resistance according to angular speeds of the lean amount. More particularly, the second correcting unit 96 receives an angular speed of the lean angle inputted from the angular speed calculating arithmetic circuit 91*b*. The second correcting unit 96 calculates an absolute value of the angular speed of the lean angle. The absolute value of the angular speed of the lean angle is hereinafter called the "angular speed of the lean amount". The second correcting unit 96 has a second correction table 96*a* correlating the second factor and angular speed of the lean amount, and obtains the second factor corresponding to the angular speed of the lean amount based on this second correction table 96*a* and the angular speed of the lean amount.

Figure 13:
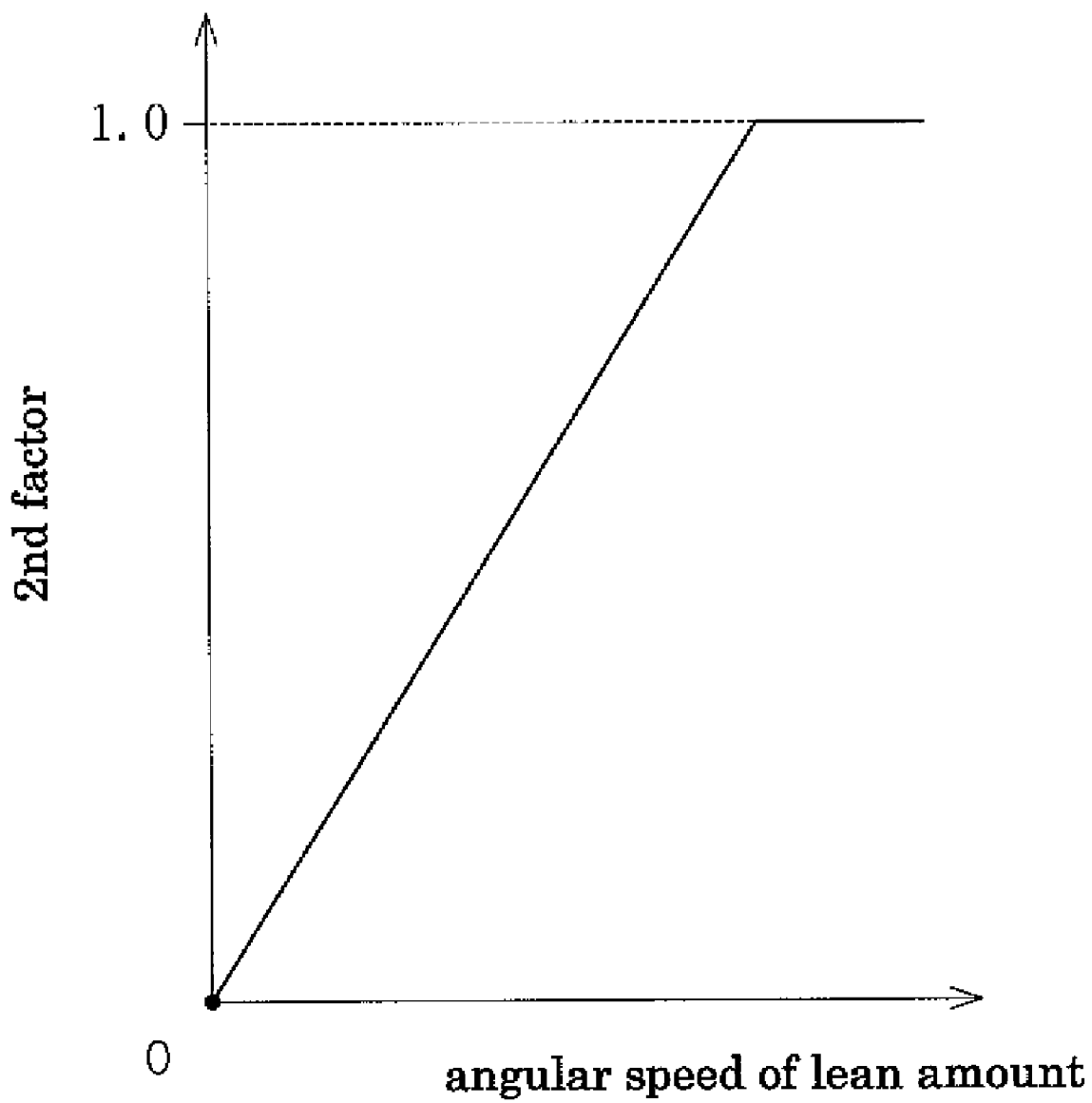
FIG. 13 is a view schematically showing an example of second correction table specifying a second factor.

FIG. 13 is a view schematically showing an example of second correction table 96*a*. In FIG. 13, the horizontal axis represents the angular speed of the lean amount, while the vertical axis represents the second factor. When the angular speed of the lean amount is "0", the second factor has minimum value "0". The second factor increases proportionally from "0" to "1" as the angular speed of the lean amount increases from "0". In a range beyond a certain value of the angular speed of the lean amount, the second factor has a fixed value (maximum "1.0"). Thus, the second correction table 96*a* illustrated in FIG. 13 includes a region where the second factor increases with the angular speed of the lean amount. In this region, the second factor increases in proportion to the angular speed of the lean amount.

5. Adjusting Unit 97

The adjusting unit 97 adjusts the first resistance, second resistance and third resistance, and determines the strength of resistance to be generated finally by the resistance applying mechanism 50. In this preferred embodiment, resistance is the damping force of the resistance applying mechanism 50, and the adjusting unit 97 determines the strength of this damping force. Each process of the adjusting unit 97 will particularly be described hereinafter.

The adjusting unit 97 receives the resistance determined by the lean amount determiner 93, the first factor inputted from the first correcting unit 95, and the second factor inputted from the second correcting unit 96. The adjusting unit 97 has information on default values of the first resistance, second resistance and third resistance. For example, the default value of the first resistance is a substantially maximum value of the damping force of the resistance applying mechanism 50, and each default value of the second resistance and third resistance is a substantially minimum value of the damping force of the resistance applying mechanism 50.

When the resistance is the first resistance, the adjusting unit 97 multiplies the default value of the first resistance by the first factor and second factor to correct the first resistance, and adjusts the resistance to be generated by the resistance applying mechanism 50 to the first resistance. The first resistance set has been corrected by the first factor, and therefore tends to become small with an increase in vehicle speed. Further, the first resistance set has been corrected by the second factor, and therefore tends to become large with an increase in the angular speed of the lean amount of the vehicle body.

When the resistance is the second resistance, the adjusting unit 97 does not correct the default value of the second resistance, but sets the second resistance to be generated by the resistance applying mechanism 50 to the default value of the second resistance. Similarly, when the resistance is the third resistance, the adjusting unit 97 does not correct the default value of the third resistance, but sets the third resistance to be generated by the resistance applying mechanism 50 to the default value of the third resistance.

The adjusting unit 97 supplies the first resistance, second resistance or third resistance set as described above to the drive circuit 98.

6. Drive Circuit 98

The drive circuit 98 drives the variable throttle valve 57*a* based on results of the processes by the adjusting unit 97. As a result, the damping force of the resistance applying mechanism 50 is changed to the damping force set by the adjusting unit 97.

The support mechanisms relating to the front wheels and rear wheels, resistance applying mechanism 50, speed sensor 81, gyro sensor 83, acceleration sensor 85 and controller 90 described above correspond to the body leaning control system according to a preferred embodiment of the present invention.

Figure 14:
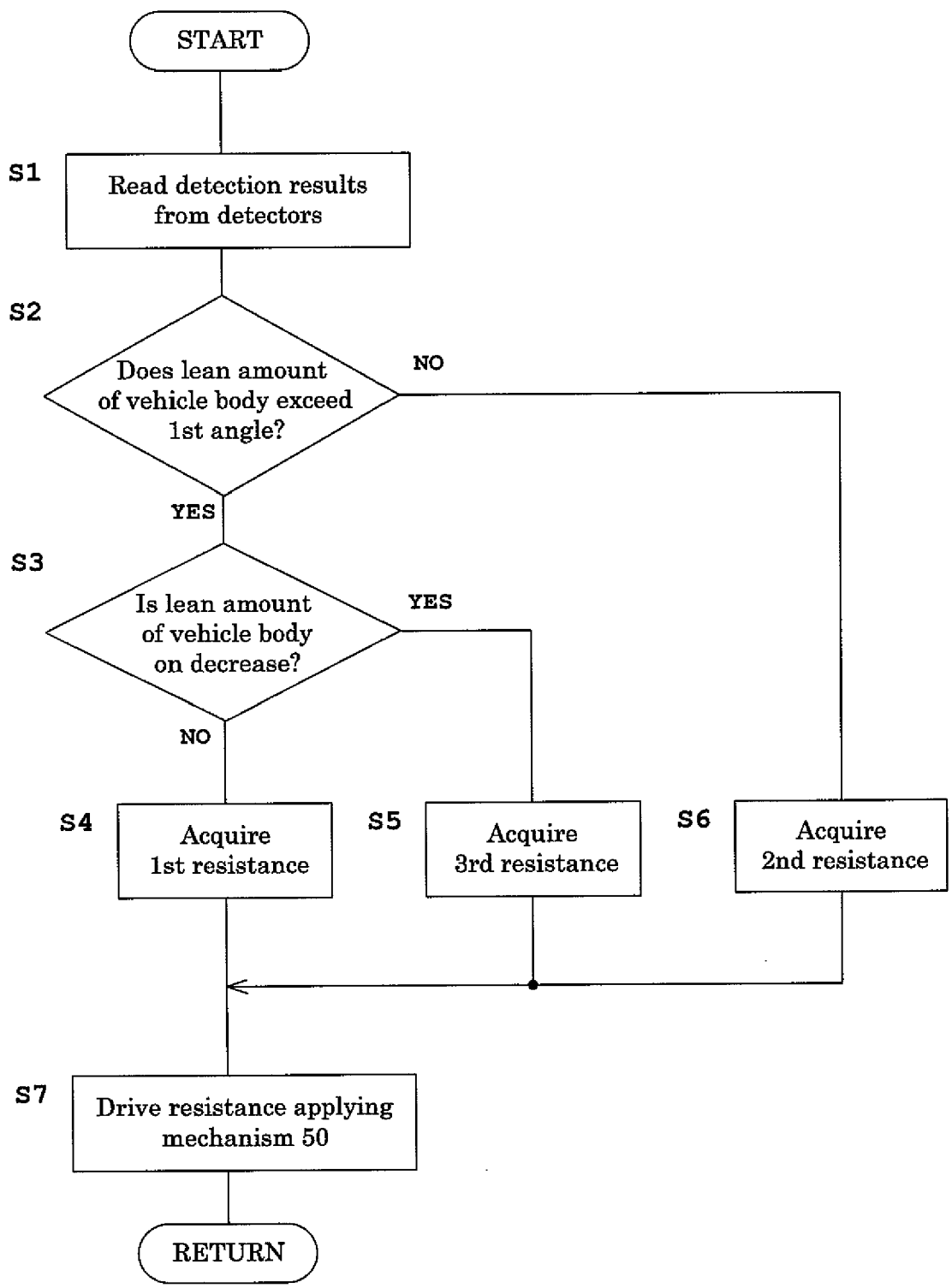
FIG. 14 is a flow chart showing an operating sequence of a body leaning control system.

Next, an example of operation of the saddle riding type vehicle 1 will be described centering on the body leaning control system according to the present preferred embodiment. FIG. 14 is a flow chart showing an operating sequence of the body leaning control system.

Step S1
Read Detection Results From Detectors

The controller 90 reads detection results from the vehicle speed sensor 81, gyro sensor 83 and acceleration sensor 85. The vehicle speed which is the detection result of the vehicle speed sensor 81 is inputted to the lean amount determiner 93 and first correcting unit 95. The angular speed which is the detection result of the gyro sensor 83 and the component Gy which is the detection result of the acceleration sensor 85 are inputted to the lean calculating arithmetic circuit 91.

Step S2
Does Lean Amount of Vehicle Body Exceed First Angle?

The lean calculating arithmetic circuit 91 acquires a lean angle and an angular speed of the lean angle from the angular speed and component Gy inputted, and supplies the acquired lean angle and angular speed of the lean angle to the lean amount determiner 93. The lean amount determiner 93 determines, based on the lean angle, vehicle speed and determination table 93*a*, whether the lean amount of the vehicle body has exceeded the first angle corresponding to the vehicle speed. When, as a result, the lean amount of the vehicle body is determined to have exceeded the first angle, the operation proceeds to step S3. Otherwise, the lean amount determiner 93 selects the second resistance to be generated by the resistance applying mechanism 50, and the operation proceeds to step S6.

Step S3
Is Lean Amount of Vehicle Body on Decrease?

The lean amount determiner 93 determines, based on the inputted lean angle and angular speed of the lean angle, whether the lean amount of the vehicle body is decreasing or not. When, as a result, the lean amount of the vehicle body is determined to be decreasing, the lean amount determiner 93 selects the third resistance to be generated by the resistance applying mechanism 50, and the operation proceeds to step S5. Otherwise, the lean amount determiner 93 selects the first resistance to be generated by the resistance applying mechanism 50, and the operation proceeds to step S4.

Step S4
Acquire First Resistance

The lean amount determiner 93 supplies the adjusting unit 97 information indicating that the resistance is the first resistance. The first correcting unit 95 acquires the first factor based on the vehicle speed and first correction table 95*a*, and supplies this first factor to the adjusting unit 97. The lean calculating arithmetic circuit 91 supplies the angular speed of the lean angle to the second correcting unit 96. The second correcting unit 96 acquires the second factor based on the angular speed of the lean angle and second correction table 96*b*, and supplies this second factor to the adjusting unit 97.

The adjusting unit 97 corrects the default value corresponding to the first resistance with the first factor and second factor, thereby adjusting the strength of the first resistance. The adjusting unit 97 supplies the adjusted first resistance to the drive circuit 98.

Step S5
Acquire Third Resistance

The lean amount determiner 93 supplies the adjusting unit 97 information indicating that the resistance is the third resistance. The adjusting unit 97 sets the strength of the third resistance to the default value corresponding to the third resistance, and supplies the set third resistance to the drive circuit 98. The strength of the third resistance is a substantially minimum value of the resistance of the resistance applying mechanism 50 as noted hereinbefore. In this step S5, the first correcting unit 95 may or may not give the first factor to the adjusting unit 97. Similarly, the second correcting unit 96 may or may not give the second factor to the adjusting unit 97.

Step S6
Acquires Second Resistance

The lean amount determiner 93 supplies the adjusting unit 97 information indicating that the resistance is the second resistance. The adjusting unit 97 sets the strength of the second resistance to the default value corresponding to the second resistance, and supplies the set second resistance to the drive circuit 98. The strength of the second resistance is the substantially minimum value of the resistance of the resistance applying mechanism 50. In this step S6, the first correcting unit 95 may or may not give the first factor to the adjusting unit 97. Similarly, the second correcting unit 96 may or may not give the second factor to the adjusting unit 97.

Step S7
Drive Resistance Applying Mechanism 50

The drive circuit 98 drives the variable throttle valve 57*a* to control the damping force of the resistance applying mechanism 50 to the adjusted first resistance, second resistance or third resistance. In the case of the second resistance and third resistance, the opening of variable throttle valve 57*a* becomes a maximum.

The resistance applying mechanism 50 resists, with the controlled damping force, rotation of the front balancer beam 27 relative to the front carrier beam 23. Since rotation of the front balancer beam 27 is interlocked with up-and-down motions of the right and left wheels 19, the damping force of the resistance applying mechanism 50 acts to resist the up-and-down motions of the right and left wheels 19 relative to the vehicle body.

In a situation where the controller 90 sets the damping force of the resistance applying mechanism 50 to the first resistance, the lean amount of the vehicle body exceeds a range for permitting the rider to return the vehicle body to the neutral position easily and the lean amount of the vehicle body is increasing. On the other hand, the first resistance is relatively strong. Thus, the resistance applying mechanism 50 inhibits rotation of the front balancer beam 27 relative to the front carrier beam 23, inhibits the up-and-down motions of the right and left wheels 19 relative to the vehicle body, and inhibits an increase in the lean amount of the vehicle body. As a result, the up-and-down motions of the right and left rear wheels 63 also are inhibited.

Consequently, a slight return control can return the lean amount of the vehicle body to the first angle or less. The lean amount of the vehicle body can be returned to the first angle or less by an accelerator operation for slightly increasing vehicle speed, or by a slight shifting of the center of gravity, for example. The rider can therefore continue a comfortable run.

In a situation where the controller 90 sets the damping force of the resistance applying mechanism 50 to the third resistance, the lean amount of the vehicle body exceeds the range for permitting the rider to return the vehicle body to the neutral position easily and the lean amount of the vehicle body is decreasing. On the other hand, the third resistance corresponds to the substantially minimum value of the damping force of the resistance applying mechanism 50, and is very weak. Thus, the resistance applying mechanism 50 can hardly prevent rotation of the front balancer beam 27, and hardly inhibits a decrease in the lean amount of the vehicle body. Therefore, the lean amount of the vehicle body decreases relatively easily, and the rider can very easily return the lean amount of the vehicle body to the first angle or less. As a result, the rider can continue a comfortable run.

In a situation where the controller 90 sets the damping force of the resistance applying mechanism 50 to the second resistance, the lean amount of the vehicle body is within the range for permitting the rider to return the vehicle body to the neutral position easily. On the other hand, the second resistance corresponds to the substantially minimum value, and is very weak. Thus, the resistance applying mechanism 50 hardly inhibits rotation of the front balancer beam 27, and hardly inhibits variations in the lean amount of the vehicle body. Therefore, the lean amount of the vehicle body varies relatively easily, and the rider can very easily change the lean amount of the vehicle body. As a result, the rider can travel while freely leaning the vehicle body.

Thus, with the body leaning control system and the saddle riding type vehicle 1 having this system according to this preferred embodiment, the controller 90 controls the damping force to the stronger first resistance when the lean amount of the vehicle body exceeds the first angle set beforehand, than (the second resistance selected) when the lean amount is at the first angle or less. As a result, the right and left wheels 19 cannot easily move up and down, and the lean amount of the vehicle body is inhibited from changing any further. This can effectively inhibit the vehicle body from further leaning beyond the first angle. The rider can therefore travel comfortably.

Since the first angle is set, as correlated to vehicle speed, to increase with vehicle speed, there is no need, in an actual traveling situation, to inhibit lean variations of the vehicle body more than necessary. Thus, a comfortable run is not prevented.

The lean calculating arithmetic circuit 91 calculates, as a lean angle, an angle of the vehicle body leaning right or left relative to the vertical direction. Thus, a lean of the vehicle body can be determined accurately regardless of traveling surface conditions, for example.

The controller 90 (adjusting unit 97) makes adjustment so that the first resistance may become weaker as vehicle speed becomes higher. Therefore, when the lean amount of the vehicle body exceeds the first angle, the first resistance of proper strength can be applied according to a speed level.

The controller 90 (adjusting unit 97) makes adjustment so that the first resistance may become stronger as the angular speed of the lean amount becomes higher. Therefore, the first resistance of proper strength can be applied according to an extent of lean variation of the vehicle body, thereby effectively inhibiting the vehicle body from leaning to excess.

Because of the structure of the damper body 51, the faster the front balancer beam 27 rotates (i.e. the greater the angular speed of the lean amount of the vehicle body is), the stronger becomes the damping force of the resistance applying mechanism 50. This, together with the characteristic of the resistance applying mechanism 50 itself, can effectively inhibit the vehicle body from leaning to excess.

The controller 90 automatically controls the resistance applying mechanism 50 without requiring a special operation by the rider. This can cope with unexpected wobbling and the like of the vehicle.

When the lean amount is decreasing, even if the lean amount exceeds the first angle, the controller 90 makes a change to the third resistance weaker than the first resistance, thereby never to prevent the vehicle body from returning to the neutral position. Particularly since the third resistance is the substantially minimum value of the resistance of the resistance applying mechanism 50, the rider can return the vehicle body to the neutral position very easily.

When the lean amount is at the first angle or less, the controller 90 makes a change to the second resistance weaker than the first resistance, thereby never to prevent variations in the lean angle of the vehicle body. Particularly, since the second resistance is the substantially minimum value of the resistance of the resistance applying mechanism 50, the rider can lean the vehicle body freely at will when the lean amount of the vehicle body is at the first angle or less.

The resistance applying mechanism 50, by applying resistance directly to the front balancer beam 27, can inhibit up-and-down motions not only of the right and left wheels 19 but of the right and left wheels 63. That is, the resistance applying mechanism 50, while having a simplified structure, can effectively inhibit up-and-down motions of the right and left wheels 19 and 63, and can effectively inhibit variations in the lean angle of the vehicle body.

The present invention is not limited to the foregoing preferred embodiment, but may be modified as described in the following paragraphs.

In the foregoing preferred embodiment, the lean amount determiner 93 preferably sets the first angle to increase with vehicle speed over the whole range of vehicle speed, but this is not limitative. A modification may be made to set the first angle to include a region where the first angle increases with vehicle speed. For example, in one vehicle speed range, the first angle may be set to increase with vehicle speed, and in the other vehicle speed range, the first angle may be set to a fixed value. In a different modification, the first angle may be set to a fixed value over the whole range of vehicle speed.

In the determination table 93*a* described in the foregoing preferred embodiment, the first angle and vehicle speed are correlated preferably by means of the curve C indicating that the first angle enlarges by the greater amount for the higher vehicle speed range, but this is not limitative. The first angle may be modified to increase in proportion to vehicle speed.

In the foregoing preferred embodiment, the first resistance, second resistance and third resistance determined by the lean amount determiner 93 preferably constitute a classification of resistances, but this is not limitative. For example, the lean amount determiner 93 may be modified to select a default value of each of the first resistance, second resistance and third resistance, and give the default value to the adjusting unit 97.

In the foregoing preferred embodiment, the controller 90, particularly the first correcting unit 95 which acquires the first factor and the adjusting unit 97 which corrects the first resistance using the first factor, preferably adjusts the first resistance to include a region where the first resistance becomes weaker as vehicle speed becomes faster for the same angular speed of the lean amount. This is not limitative. The region where the first resistance becomes weaker as vehicle speed becomes faster may cover the whole range of vehicle speed, or only a partial range of vehicle speed. For example, in one vehicle speed range, the first resistance may be set to decrease as vehicle speed increases, and in the other vehicle speed range, the first resistance may be set to a fixed value. In a different modification, the first resistance may be set to a fixed value over the whole range of vehicle speed.

In the first correction table 95*a* described in the foregoing preferred embodiment, the first factor and vehicle speed are correlated preferably by means of the curve indicating that the first factor diminishes by the greater amount for the lower vehicle speed range, but this is not limitative. The first factor may be modified to diminish at a fixed rate with an increase in vehicle speed. In other words, in the first correction table 95*a*, the first factor may diminish linearly with an increase in vehicle speed.

In the foregoing preferred embodiment, the controller 90, particularly the second correcting unit 96 which acquires the second factor and the adjusting unit 97 which corrects the first resistance using the second factor, preferably sets the first resistance to include a region where the first resistance becomes stronger as the angular speed of the lean amount becomes faster for the same vehicle speed. This is not limitative. The region where the first resistance becomes stronger as the angular speed of the lean amount becomes faster may cover the whole range of angular speed of the lean amount, or only a partial range of angular speed of the lean amount. For example, in one range of angular speed of the lean amount, the first resistance may be set to increase with the angular speed of the lean amount, and in the other range of angular speed of the lean amount, the first resistance may be set to a fixed value. In a different modification, the first resistance may be set to a fixed value over the whole range of angular speed of the lean amount.

In the second correction table 96*a* described in the foregoing preferred embodiment, the second factor and the angular speed of the lean amount are correlated such that the second factor increases at a fixed rate with an increase in the angular speed of the lean amount. In other words, in the second correction table 96*a*, the second factor enlarges linearly with an increase in the angular speed of the lean amount. This is not limitative. In the second correction table 96*a*, the second factor and the angular speed of the lean amount may be correlated by means of a curve.

In the foregoing preferred embodiment, the adjusting unit 97 preferably sets a substantially minimum value of the damping force of the resistance applying mechanism 50 as each of the second resistance and third resistance, but this is not limitative. The adjusting unit 97 may be modified to set a larger value than the substantially minimum value as the second and third resistances as long as they are weaker than the first resistance. For example, default values of the second resistance and third resistance may be selected as appropriate, or the default values of the second resistance and third resistance may be corrected. When correcting the second resistance and third resistance, the first factor and second factor may be used, or factors other than these may be used.

In the foregoing preferred embodiment, the variable throttle valve 57*a* is preferably used to vary the flow resistance of hydraulic oil, but this is not limitative. The variable throttle valve 57*a* may be replaced with any other mechanism designed or selected as appropriate for varying the flow resistance of hydraulic oil.

In the foregoing preferred embodiment, the damper body 51 preferably includes hydraulic oil, but this is not limitative. Instead, for example, the damper body may be modified, as appropriate, to have a magnetic fluid as working fluid.

Figure 15:
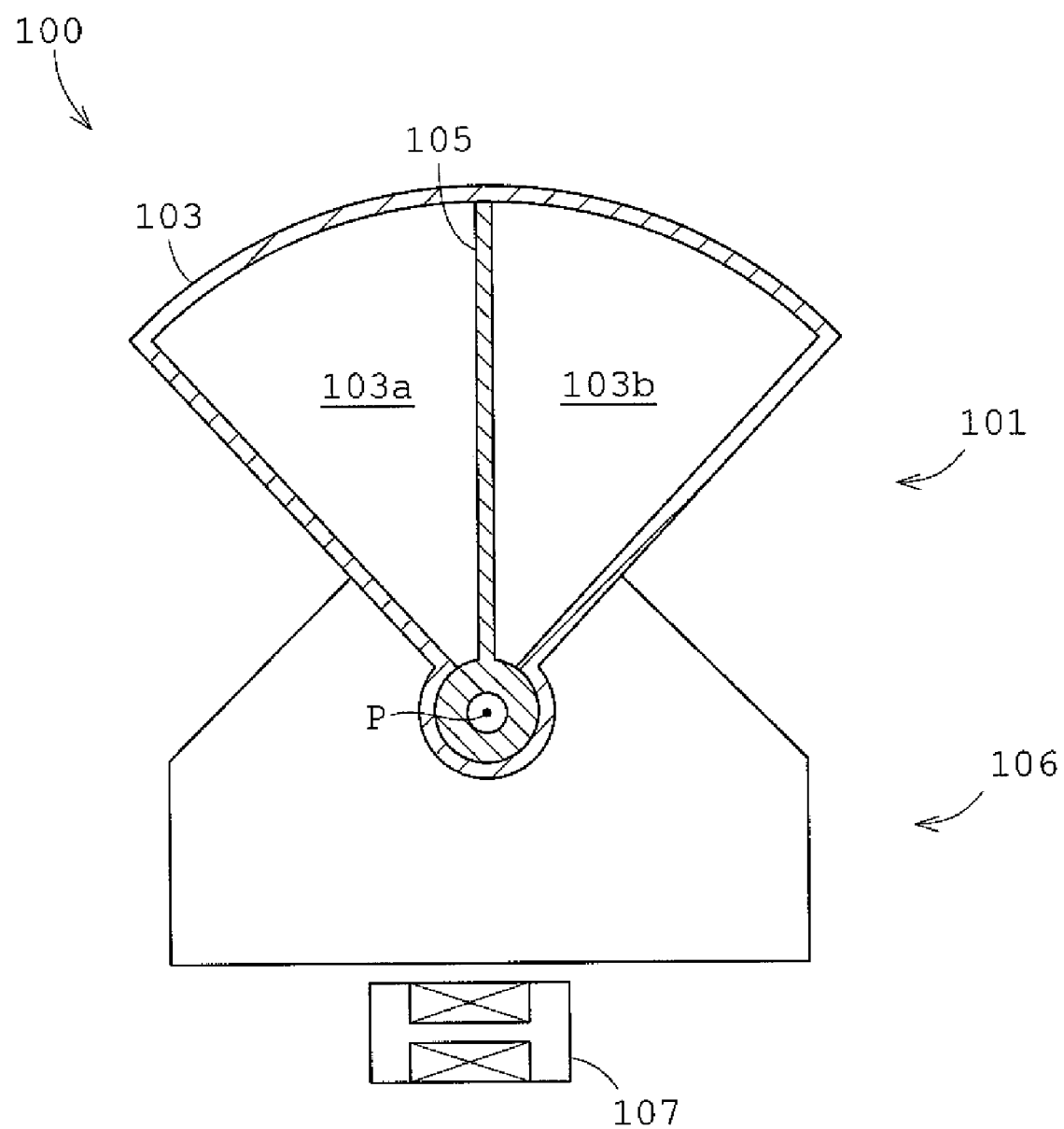
FIG. 15 is a schematic view of a resistance applying mechanism according to a modified preferred embodiment of the present invention.

FIG. 15 is a schematic view of a resistance applying mechanism according to a modified preferred embodiment of the present invention. A resistance applying mechanism 100 includes a damper body 101 having a magnetic fluid as working fluid. The damper body 101 has a housing 103 defining a space therein, and a partition member 105 swingable about an axis P relative to the housing 103 and dividing the interior space of the housing 103 into two oil chambers 103*a* and 103*b*. The two chambers 103*a* and 103*b* preferably contain the magnetic fluid, respectively. A pipe 106 extends between the chamber 103*a* and chamber 103*b* for allowing the magnetic fluid to flow therebetween. A magnetic field generating coil 107 is disposed adjacent the pipe 106. The controller 90 supplies a current of arbitrary current value to the magnetic field generating coil 107. The controller 90 is omitted from FIG. 15.

When the current is supplied from the controller 90, the magnetic field generating coil 107 will generate a magnetic field corresponding to the current value supplied. The magnetic fluid has viscosity that is variable with a magnetic field strength to change flow resistance. This flow resistance serves as the damping force for damping relative movement between the housing 103 and partition member 105. The controller 90 controls the damping force of the damper body 101 by varying the current value. The magnetic field generating coil 107 corresponds to the adjusting element according to a preferred embodiment of the present invention.

In the foregoing preferred embodiment, the damper body 51 is provided on the rotary shaft of the balancer mechanism, but this is not limitative. For example, the damper body 51 may be provided on the lower pivot shaft 14 or upper pivot shaft 16, and may be modified to apply resistance to rotation of the lower swing arm 13 or upper swing arm 15. The rotations of the lower swing arm 13 and upper swing arm 15 are interlocked to up-and-down motions of the right and left wheels 19. In such a modified preferred embodiment also, the resistance applying mechanism 50 can apply the resistance to the up-and-down motions of the right and left wheels 19 through the support mechanism.

In the foregoing preferred embodiment, the damper body 51 preferably is the rotary type, but this is not limitative. A modification may be made to use a cylinder type damper body for forming the resistance applying mechanism.

Figure 16:
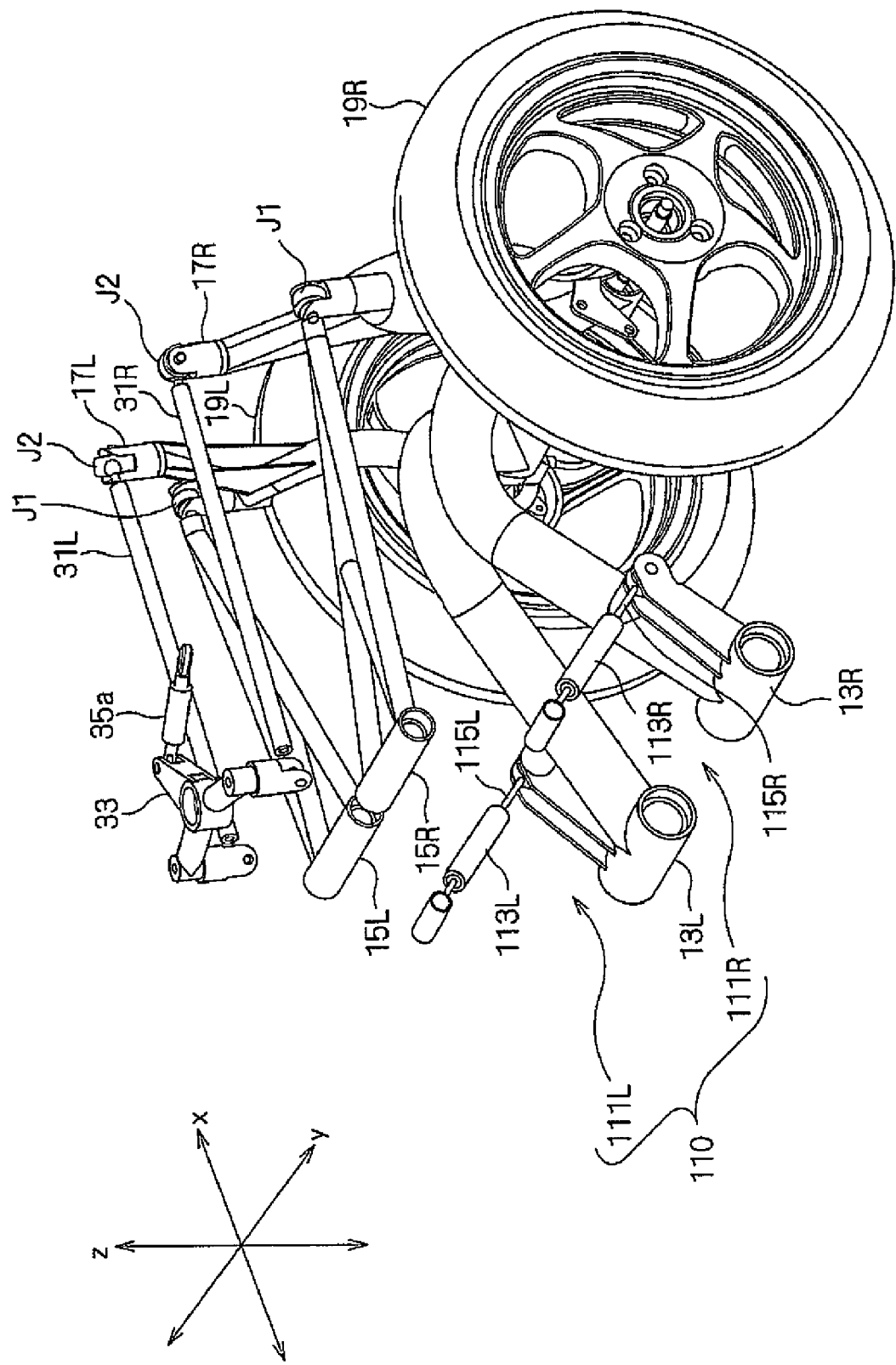
FIG. 16 is a perspective view of a principal portion of a resistance applying mechanism according to a further modified preferred embodiment of the present invention.
Figure 17:
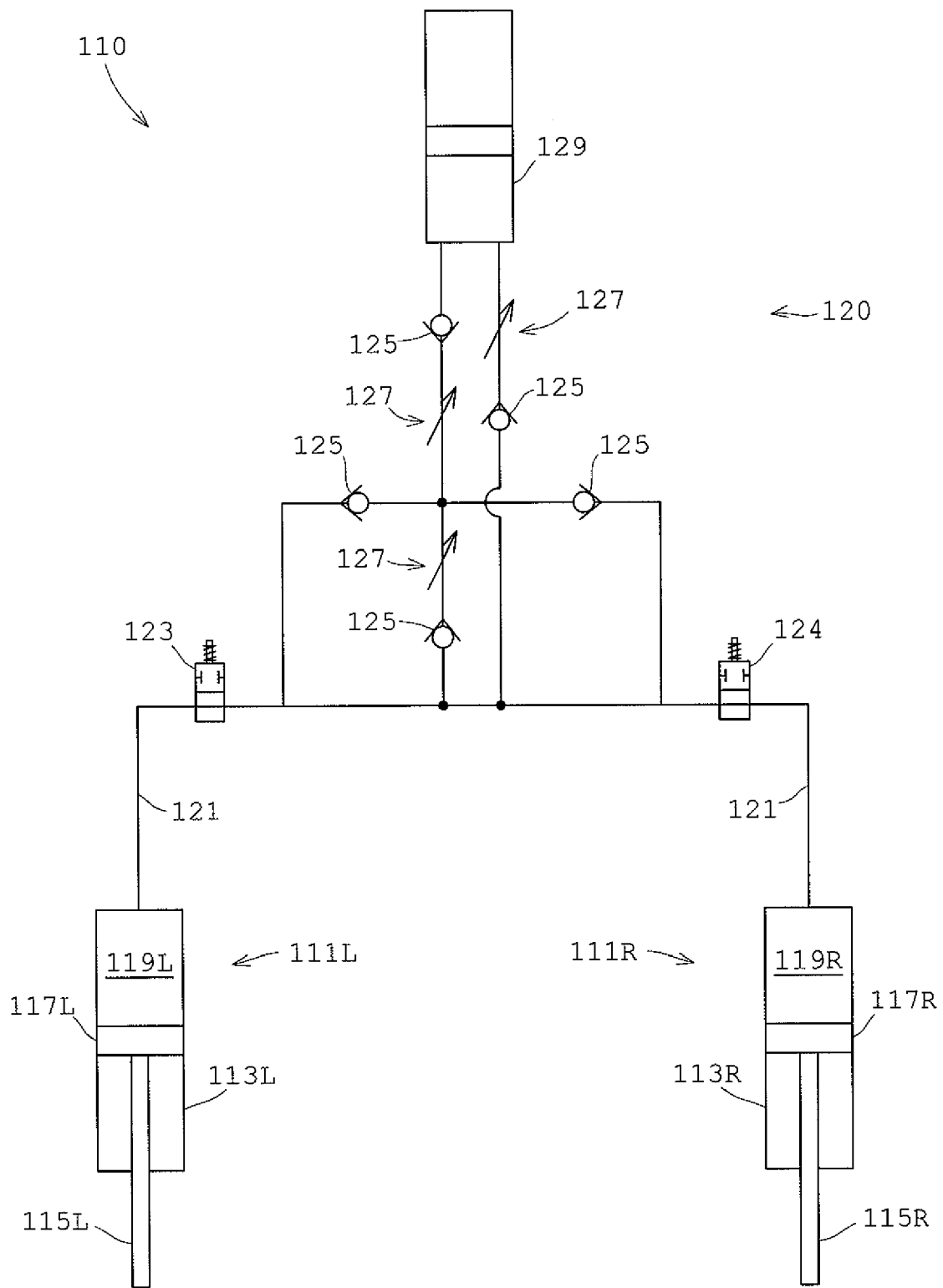
FIG. 17 is a schematic diagram of the resistance applying mechanism according to the further modified preferred embodiment of the present invention.

Reference is made to FIGS. 16 and 17. FIG. 16 is a perspective view of a principal portion of a resistance applying mechanism according to a further modified preferred embodiment of the present invention. FIG. 17 is a schematic diagram of the resistance applying mechanism according to the further modified preferred embodiment of the present invention. As shown in FIG. 16, a resistance applying mechanism 110 includes a pair of damper bodies 111R and 111L. The damper body 111R is disposed between the lower right swing arm 13R and the vehicle body. More particularly, the damper body 111R has a cylinder 113R connected to the vehicle body, and a piston rod 115R connected to the lower right swing arm 13R. This construction can damp rotation of the lower right swing arm 13R about the lower pivot shaft 14. Similarly, the damper body 111L is disposed between the lower left swing arm 13L and the vehicle body.

As shown in FIG. 17, the damper body 111R further includes a piston 117R mounted in the cylinder 113R and connected to the piston rod 115R, and an oil chamber 119R partitioned by the piston 117R. Similarly, the damper body 111L includes a piston 117L and an oil chamber 119L.

The oil chamber 119R and oil chamber 119L are interconnected by a hydraulic circuit 120. The hydraulic circuit 120 includes an oil pipe 121, solenoid-operated valves 123 and 124, a plurality (e.g., five) of check valves 125, three valves 127 and a reserve tank 129. Hydraulic oil can flow between the oil chambers 119R and 119L only through both of the solenoid-operated valves 123 and 124.

When, for example, the lower right swing arm 13R rotates about the lower pivot shaft 14 to lower the right wheel 19R and extend the piston rod 115R, the oil chamber 119R enlarges, hydraulic oil flows from the oil chamber 119L into the oil chamber 119R, and the oil chamber 119L diminishes. Consequently, the piston rod 115L retracts to pull up the lower left swing arm 13L, and the left wheel 19L rises by an amount corresponding to the descent of the right wheel 19R. Thus, the right wheel 19R and left wheel 19L go up and down by an equal amount in substantially opposite vertical directions of the vehicle body.

Here, the flow resistance of hydraulic oil serves as the damping force for damping relative movement between the cylinders 113 and piston rods 115. This damping force becomes a resistance to rotation of the lower right swing arm 13R and lower left swing arm 13L, and further becomes a resistance to the up-and-down motions of the pair of right and left wheels 19. The flow resistance of hydraulic oil is variable by the solenoid-operated valves 123 and 124. The solenoid-operated valves 123 and 124 correspond to the adjusting element according to a preferred embodiment of the present invention.

The modification including such resistance applying mechanism 110 can dispense with the construction including the front carrier beam 23 and front suspension 25 described above. The drive circuit 98 of the controller 90 is changed to control the resistance of the resistance applying mechanism 100 by driving the solenoid-operated valves 123 and 124.

The foregoing preferred embodiment preferably includes the gyro sensor 83 and acceleration sensor 85, and detects the lean amount of the vehicle body and the angular speed of the lean amount based on detection results of these sensors. This is not limitative. An appropriate sensor is applicable as long as information on the lean amount of the vehicle body is detectable. Similarly, an appropriate sensor is applicable as long as information on the angular speed of the lean amount is detectable. A construction may be provided that separately includes a sensor arranged to detect the information on the lean amount of the vehicle body, and a sensor arranged to detect the information on the angular speed of the lean amount.

In the foregoing preferred embodiment, the lean angle has been described as an angle of the up-and-down direction of the vehicle body inclined right or left relative to the vertical direction, but this is not limitative. That is, the present invention includes, besides the lean angle defined strictly in relation to the vertical direction, a lean angle defined substantially in relation to an approximately vertical direction. Where, for example, conditions of the traveling surface R1 have only negligible influences on the lean angle, the lean angle may be defined by a positional relationship between the vehicle body and the right and left wheels 19. Provided that the traveling surface R1 is substantially flat, an amount of rotation of the front balancer beam 27 relative to the front carrier beam 23 may be detected, and a rotating angle of the front balancer beam 27 with reference to the time of neutral position may be used as it is as lean angle of the vehicle body.

In the foregoing preferred embodiment, the resistance applying mechanism 50 inhibits up-and-down motions of the right and left wheels 19, but this is not limitative. For example, a resistance applying mechanism that inhibits up-and-down motions of the right and left wheels 63 may be added, or two resistance applying mechanisms may be provided for the right and left wheels 19 and 63, respectively.

In the foregoing preferred embodiment, the support mechanism relating to the right and left wheels 19 preferably is roughly divided into the right side support mechanism, left side support mechanism and balancer mechanism. The right side support mechanism and left side support mechanism preferably are directly and pivotably supported by the main frame 11, respectively. This is not limitative. For example, each of the right side support mechanism and left side support mechanism may be indirectly supported by the main frame 11 through the balancer mechanism. In this case, each of the right side support mechanism and left side support mechanism is vertically movably interlocked to the balancer mechanism.

Even if the support mechanism relating to the right and left wheels 19 is modified in this way, the right wheel 19R and left wheel 19L supported by the right side support mechanism and left side support mechanism, respectively, can conveniently be moved up and down relative to the vehicle body.

The foregoing preferred embodiment shows a four-wheeled automotive vehicle having the right and left wheels 19 and 63 at the front and rear of the vehicle body, for example. The vehicle may also be a three-wheeled automotive vehicle having one wheel at one of the front and rear, and a pair of wheels at the other. The vehicle may also be a buggy or all terrain vehicle (ATV).

In the foregoing preferred embodiment, the saddle riding type vehicle 1 preferably has wheels (right and left wheels 19 and 63), but this is not limitative. For example, the wheels may be replaced with skis. A saddle riding type vehicle constructed in this way is what is called a snowmobile.

Figure 18:
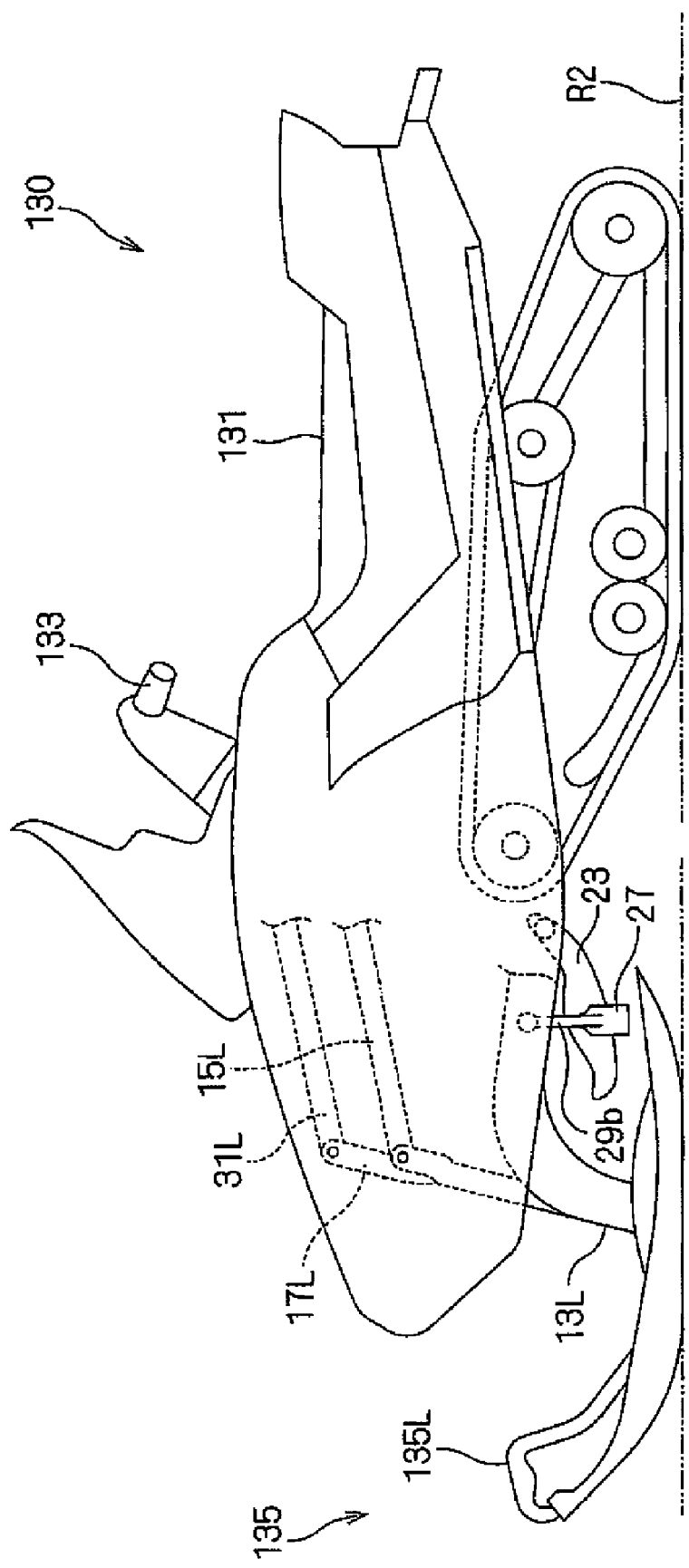
FIG. 18 is a side view showing an outward appearance of a saddle riding type vehicle according to a modified preferred embodiment of the present invention.

Reference is made to FIG. 18. FIG. 18 is a side view showing an outward appearance of a saddle riding type vehicle according to a modified preferred embodiment. The saddle riding type vehicle according to this modified preferred embodiment is a snowmobile 130 which can travel on a snow surface R2. In FIG. 18, the left side of the drawing is the front of the snowmobile 130. The snowmobile 130 has a seat 131 for the rider, and a handlebar 133 operable by the rider. The snowmobile 130 has also a pair of skis 135 attached to the front portion of a vehicle body for contacting the snow surface R2. FIG. 18 shows only the left ski 135L disposed on the left side as seen from the rider on the snowmobile 130. The skis 135 correspond to the traveling members according to a preferred embodiment of the present invention.

The pair of right and left skis 135 are supported to be movable up and down relative to the vehicle body by the support mechanism as described above. The skis 135 are interlocked to the handlebar 133 through the steering mechanism described above.

The lower left swing arm 13L, upper left swing arm 15L and left front tube 17L shown in FIG. 18 constitute the left side support mechanism corresponding to the left ski 135L. The front carrier beam 23, front balancer beam 27 and rod 29b constitute the balancer mechanism. Further, the left steering rod 31L forms a part of the steering mechanism.

Although not shown, the snowmobile 130 further includes the resistance applying mechanism, speed sensor 81, gyro sensor 83, acceleration sensor 85 and controller 90 described above in Preferred Embodiment 1.

With such a snowmobile 130 also, the vehicle body can conveniently be inhibited from leaning in excess of the first angle. The rider can therefore travel comfortably. This modification provides the same various functions and effects as the preferred embodiment described above.

The preferred embodiment and the modifications described above may be further varied as appropriate by replacing or combining certain components with other modifications.

The present invention may be embodied in other specific forms without departing from the spirit or essential attributes thereof and, accordingly, reference should be made to the appended claims, rather than to the foregoing specification, as indicating the scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A body leaning control system for a saddle riding type vehicle capable of making turns by leaning a vehicle body, the body leaning control system comprising:
  a support mechanism arranged to support at least a pair of traveling members that contact a traveling surface and are provided at opposite sides of the vehicle body to be movable up and down relative to the vehicle body;
  a resistance applying mechanism arranged to apply to the support mechanism a resistance to up-and-down motions of the pair of traveling members;
  a lean amount acquiring device arranged to detect information on a lean amount of the vehicle body;
  a controller arranged to perform control, based on detection results received from the lean amount acquiring device, to set the resistance of the resistance applying mechanism to a first resistance when the lean amount of the vehicle body exceeds a first angle, and to set the resistance of the resistance applying mechanism to a second resistance smaller than the first resistance when the lean amount of the vehicle body is equal to or less than the first angle; and
  a vehicle speed detecting device arranged to detect a vehicle speed; wherein
  the controller is arranged to set the first angle to include a region where the first angle increases with the vehicle speed, based on a detection result received from the vehicle speed detecting device.

2. The system according to claim 1, wherein the controller is arranged, based on the detection results received from the vehicle speed detecting device, to set the first resistance to include a region where the first resistance decreases with an increase in the vehicle speed.

3. The system according to claim 1, wherein the lean amount of the vehicle body is a degree of an angle at which the vehicle body leans sideways relative to a substantially vertical direction.

4. The system according to claim 1, further comprising an angular speed acquiring device arranged to detect information on an angular speed of the lean amount of the vehicle body, wherein the controller is arranged to perform control, based on detection results received from the angular speed acquiring device, to set the first resistance to include a region where the first resistance increases with the angular speed of the lean amount.

5. The system according to claim 1, further comprising an angular speed acquiring device arranged to detect information on an angular speed of the lean amount of the vehicle body, wherein the controller is arranged to determine whether the lean amount of the vehicle body is decreasing, based on detection results received from the lean amount acquiring device and the angular speed acquiring device, and to set the resistance of the resistance applying mechanism to a third resistance smaller than the first resistance when the lean amount of the vehicle body exceeds the first angle and is decreasing.

6. The system according to claim 5, wherein the third resistance has a substantially minimum value of the resistance of the resistance applying mechanism.

7. The system according to claim 1, wherein the second resistance has a substantially minimum value of the resistance of the resistance applying mechanism.

8. The system according to claim 1, wherein the support mechanism includes:
  a right side support mechanism arranged to vertically movably support a right traveling member of the pair of traveling members;
  a left side support mechanism arranged to vertically movably support a left traveling member of the pair of traveling members; and
  a balancer mechanism rotatably supported by the vehicle body and interlocked to the right side support mechanism and the left side support mechanism to allow the right traveling member and the left traveling member to move up and down in corresponding amounts in opposite directions; and
  the resistance applying mechanism includes:
  a damper body arranged to damp rotation of the balancer mechanism relative to the vehicle body; and
  an adjusting element arranged to vary a damping force of the damper body; wherein
  the controller is arranged to control resistance applied to the rotation of the balancer mechanism by driving the adjusting element.

9. The system according to claim 1, wherein the traveling members are wheels or skis.

10. A saddle riding type vehicle arranged to make turns by leaning a vehicle body, the saddle riding type vehicle comprising:
  a body leaning control system including:
  a support mechanism arranged to support at least a pair of traveling members that contact a traveling surface and are provided at opposite sides of the vehicle body to be movable up and down relative to the vehicle body;
a resistance applying mechanism arranged to apply to the support mechanism a resistance to up-and-down motions of the pair of traveling members;
a lean amount acquiring device arranged to detect information on a lean amount of the vehicle body; and
a controller arranged to perform control, based on detection results received from the lean amount acquiring device, to set the resistance of the resistance applying mechanism to a first resistance when the lean amount of the vehicle body exceeds a first angle, and to set the resistance of the resistance applying mechanism to a second resistance smaller than the first resistance when the lean amount of the vehicle body is at the first angle or less; and
a vehicle speed detecting device arranged to detect a vehicle speed; wherein
the controller is arranged to set the first angle to include a region where the first angle increases with the vehicle speed, based on a detection result received from the vehicle speed detecting device.

* * * * *